United States Patent
Waatti

(10) Patent No.: US 10,264,851 B2
(45) Date of Patent: Apr. 23, 2019

(54) ARTICLE OF FOOTWEAR HAVING PRINTED STRUCTURES

(71) Applicant: NIKE, Inc., Beaverton, OR (US)

(72) Inventor: Todd A. Waatti, Battle Ground, WA (US)

(73) Assignee: NIKE, Inc., Beaverton, OR (US)

(*) Notice: Subject to any disclaimer, the term of this patent is extended or adjusted under 35 U.S.C. 154(b) by 130 days.

(21) Appl. No.: 15/275,828

(22) Filed: Sep. 26, 2016

(65) Prior Publication Data

US 2017/0006968 A1 Jan. 12, 2017

Related U.S. Application Data

(62) Division of application No. 14/612,481, filed on Feb. 3, 2015, now Pat. No. 9,474,331.

(51) Int. Cl.
| | |
|---|---|
| *A43B 5/00* | (2006.01) |
| *A43C 1/04* | (2006.01) |
| *A43B 23/02* | (2006.01) |
| *B29D 35/12* | (2010.01) |
| *B29C 70/84* | (2006.01) |
| *B29D 35/14* | (2010.01) |
| *B29C 70/68* | (2006.01) |
| *A43B 1/02* | (2006.01) |

(Continued)

(52) U.S. Cl.
CPC ............... *A43C 1/04* (2013.01); *A43B 1/02* (2013.01); *A43B 23/021* (2013.01); *A43B 23/0205* (2013.01); *A43B 23/0215* (2013.01); *A43B 23/0225* (2013.01); *A43B 23/0235* (2013.01); *A43C 5/00* (2013.01); *A43D 11/00* (2013.01); *A43D 11/01* (2013.01); *A43D 95/14* (2013.01); *B29C 64/106* (2017.08); *B29C 64/112* (2017.08); *B29C 70/682* (2013.01); *B29C 70/845* (2013.01); *B29D 35/126* (2013.01); *B29D 35/146* (2013.01); *B33Y 10/00* (2014.12); *B33Y 80/00* (2014.12)

(58) Field of Classification Search
CPC .... A43C 1/00; A43C 1/04; A43C 5/00; A43C 11/00; A43C 11/0004
USPC ............................................. 36/50.1, 45, 88
See application file for complete search history.

(56) References Cited

U.S. PATENT DOCUMENTS

| | | | |
|---|---|---|---|
| 3,512,224 A | 5/1970 | Newton | |
| 4,447,967 A * | 5/1984 | Zaino | A43B 23/0235 36/45 |

(Continued)

FOREIGN PATENT DOCUMENTS

| | | |
|---|---|---|
| JP | 0819440 | 7/1996 |
| WO | 2016126348 | 8/2016 |

OTHER PUBLICATIONS

International Search Report and Written Opinion for Application No. PCT/US2015/067925, dated Jul. 25, 2016.

(Continued)

*Primary Examiner* — Marie D Bays
(74) *Attorney, Agent, or Firm* — Klarquist Sparkman, LLP

(57) ABSTRACT

An article of footwear having printed structures disposed on the article by a three-dimensional printer is disclosed. The printed structures include extended portions and fastener receiving portions. The extended portions are at least partially embedded in the upper. The fastener receiving portions are at least partially spaced apart from an exterior surface of the upper.

20 Claims, 21 Drawing Sheets

(51) Int. Cl.
*A43C 5/00* (2006.01)
*A43D 11/00* (2006.01)
*A43D 11/01* (2006.01)
*A43D 95/14* (2006.01)
*B29C 64/106* (2017.01)
*B29C 64/112* (2017.01)
*B33Y 10/00* (2015.01)
*B33Y 80/00* (2015.01)

(56) References Cited

U.S. PATENT DOCUMENTS

| | | | | |
|---|---|---|---|---|
| 5,184,378 | A * | 2/1993 | Batra | A43C 1/04 |
| | | | | 24/714.6 |
| 5,377,430 | A * | 1/1995 | Hatfield | A43B 3/08 |
| | | | | 24/714.6 |
| 5,497,564 | A * | 3/1996 | Allen | A43C 5/00 |
| | | | | 24/713.7 |
| 5,692,319 | A * | 12/1997 | Parker | A43B 7/1495 |
| | | | | 36/114 |
| 6,241,930 | B1 | 6/2001 | Harrison | |
| 8,065,818 | B2 | 11/2011 | Greene et al. | |
| 8,161,666 | B2 * | 4/2012 | Liles | A43B 3/0078 |
| | | | | 36/50.1 |
| 8,312,646 | B2 * | 11/2012 | Meschter | A43B 3/26 |
| | | | | 36/45 |
| 8,418,380 | B2 * | 4/2013 | Dojan | A43B 1/0072 |
| | | | | 36/45 |
| 8,578,632 | B2 * | 11/2013 | Bell | A43B 1/0072 |
| | | | | 36/45 |
| 8,806,776 | B2 * | 8/2014 | Leick | A43B 1/0081 |
| | | | | 12/142 LC |
| 8,869,435 | B2 * | 10/2014 | Hatfield | A43B 5/001 |
| | | | | 36/102 |
| 8,875,418 | B2 * | 11/2014 | Long | A43B 23/0235 |
| | | | | 36/45 |
| 2006/0283042 | A1 * | 12/2006 | Greene | A43B 9/00 |
| | | | | 36/3 A |
| 2007/0271822 | A1 * | 11/2007 | Meschter | A43B 7/14 |
| | | | | 36/45 |
| 2008/0078103 | A1 * | 4/2008 | Liles | A43B 3/0078 |
| | | | | 36/50.1 |
| 2008/0110048 | A1 | 5/2008 | Dua et al. | |
| 2010/0251564 | A1 * | 10/2010 | Meschter | A43B 23/0225 |
| | | | | 36/28 |
| 2011/0113648 | A1 * | 5/2011 | Leick | A43B 1/0081 |
| | | | | 36/50.1 |
| 2012/0011744 | A1 * | 1/2012 | Bell | A43B 1/0072 |
| | | | | 36/91 |
| 2012/0023778 | A1 | 2/2012 | Dojan et al. | |
| 2013/0047877 | A1 | 2/2013 | Yoo et al. | |
| 2014/0020192 | A1 | 1/2014 | Jones et al. | |
| 2014/0245633 | A1 * | 9/2014 | Podhajny | A43B 1/04 |
| | | | | 36/45 |
| 2016/0015126 | A1 * | 1/2016 | Farris | A43B 13/141 |
| | | | | 36/88 |
| 2016/0219982 | A1 * | 8/2016 | Waatti | A43C 1/04 |
| 2017/0251767 | A1 * | 9/2017 | Greene | A43B 9/00 |

OTHER PUBLICATIONS

Invitation to Pay Additional Fees dated May 17, 2016 for PCT Application No. PCT/US2015/067925.

* cited by examiner

ARTICLE OF FOOTWEAR HAVING PRINTED STRUCTURES

CROSS-REFERENCE TO RELATED APPLICATION

This application is a divisional of Waatti, U.S. Patent Application Publication No. 2016/0219982, published on Aug. 4, 2016, the entire disclosure of which is incorporated herein by reference.

BACKGROUND

The present embodiments relate generally to articles of footwear, and in particular to articles of footwear having lace engaging features.

Articles of footwear generally include an upper and a sole assembly. The upper may be formed from a variety of materials that are stitched (sewn) or adhesively bonded together to form a space or void within the footwear in order to support and secure a foot. The sole assembly is secured to a lower portion of the upper and is generally positioned between the foot and the ground. In many articles of footwear, including athletic footwear styles, the sole assembly often incorporates an insole, a midsole, and an outsole.

BRIEF DESCRIPTION OF THE DRAWINGS

The embodiments can be better understood with reference to the following drawings and description. The components in the figures are not necessarily to scale, emphasis instead being placed upon illustrating the principles of the embodiments. Moreover, in the figures, like reference numerals designate corresponding parts throughout the different views.

DETAILED DESCRIPTION

The embodiments include provisions for printing structures onto articles. In one aspect, a method of making an article of footwear with a printed structure includes providing an upper of the article of footwear and providing a printer, where the printer includes a print head and a printable material. The method further includes printing the printable material onto the upper to form an extended portion of the printed structure that is attached to the upper and printing the printable material to form a fastener receiving portion of the printed structure that extends from the extended portion. The fastener receiving portion includes an aperture for receiving a fastener.

In another aspect, a method of making an article of footwear with a printed structure includes providing an upper of the article of footwear. The method also includes providing a release layer on an exterior portion of the upper and providing a printer, where the printer includes a print head and a printable material. The method further includes printing the printable material onto a portion of the upper to form an attached portion of the printed structure. The method also includes printing the printable material on the release layer to form a free portion of the printed structure that extends from the attached portion, where the free portion has an aperture. The method also includes removing the release layer from the upper.

In still another aspect, an article of footwear includes a sole structure and an upper with a textile material. The article of footwear also includes a fastener receiving member attached to the upper, where the fastener receiving member includes an extended portion and a fastener receiving portion. The fastener receiving portion is connected to the extended portion. The extended portion of the fastener receiving member is at least partially embedded within and bonded to the textile material. The fastener receiving portion includes a loop structure, the loop structure has an aperture for receiving insertion of a lace therethrough.

Other systems, methods, features and advantages of the embodiments will be, or will become, apparent to one of ordinary skill in the art upon examination of the following figures and detailed description.

Figure 1:
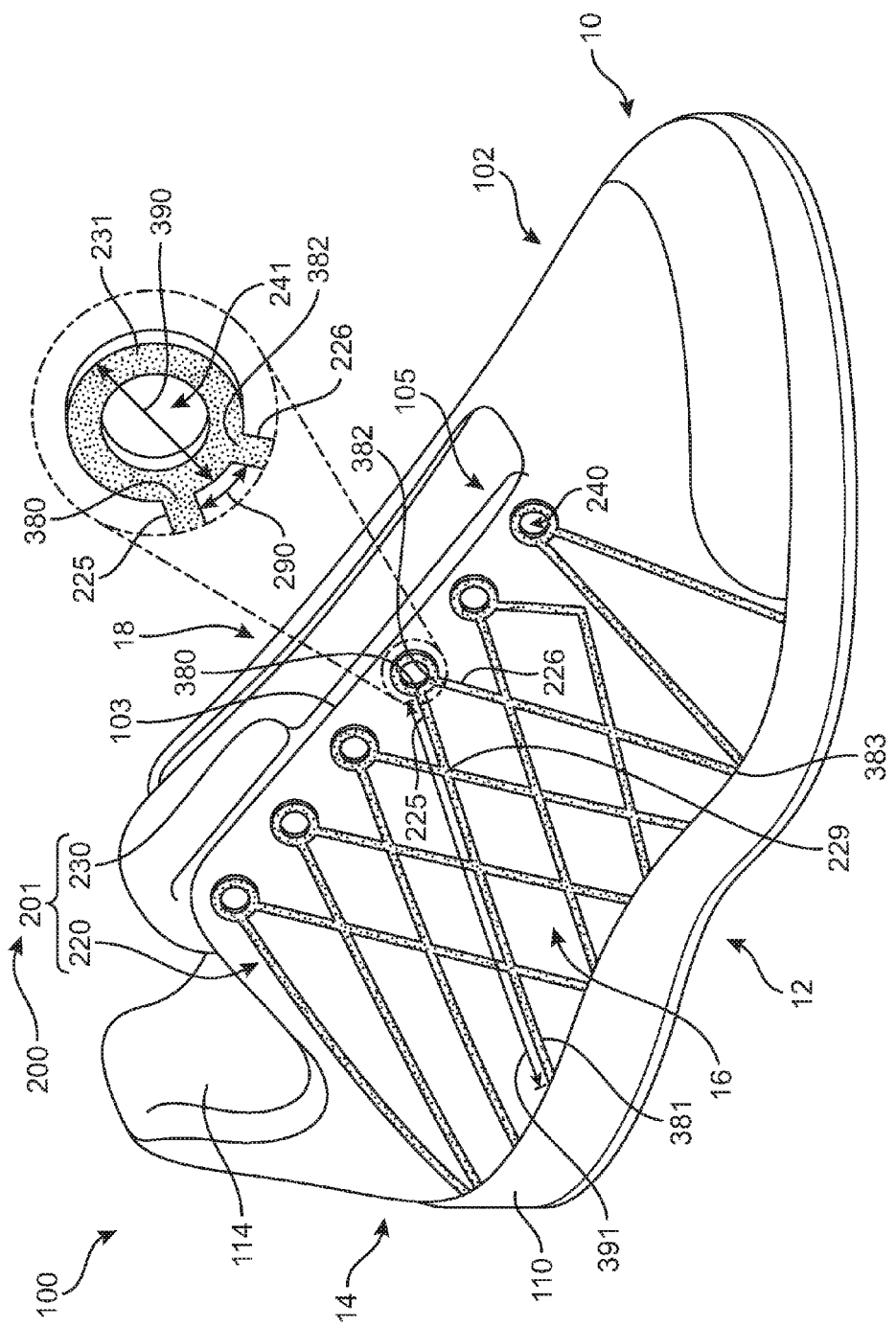
FIG. 1 is an isometric side view of an embodiment of an article of footwear showing the lateral side of the article having printed structures.

FIG. 1 illustrates an isometric view of an embodiment of an article of footwear 100, or simply article 100. Although the embodiments throughout this detailed description depict articles configured as athletic articles of footwear, in other embodiments the articles may be configured as various other kinds of footwear including, but not limited to: hiking boots, soccer shoes, football shoes, sneakers, running shoes, cross-training shoes, rugby shoes, basketball shoes, baseball shoes as well as other kinds of shoes. Moreover, in some embodiments, articles may be configured as various kinds of non-sports related footwear, including, but not limited to: slippers, sandals, high heeled footwear, loafers as well as any other kinds of footwear.

Articles are generally made to fit various sizes of feet. In the embodiments shown, the various articles are configured with the same footwear size. In different embodiments, the articles could be configured with any footwear sizes, including any conventional sizes for footwear known in the art. In some embodiments, an article of footwear may be designed to fit the feet of a child. In other embodiments, an article of footwear may be designed to fit the feet of an adult. Still, in other embodiments, an article of footwear may be designed to fit the feet of a man or a woman.

In some embodiments, an article of footwear may include an upper and a sole system. In the embodiment shown in FIG. 1, article 100 has upper 102 attached to sole system 110. Sole system 110 is secured to upper 102 and extends between the foot and the ground when an article is worn. In different embodiments, sole system 110 may include different components. For example, sole system 110 may include an outsole, a midsole, and/or an insole. In some cases, one or more of these components may be optional.

Sole system 110 may provide one or more functions for an article. For example, in some embodiments, sole system 110 may be configured to provide traction for an article. In addition to providing traction, sole system 110 may attenuate ground reaction forces when compressed between the foot and the ground during walking, running or other ambulatory activities. The configuration of sole system 110 may vary significantly in different embodiments to include a variety of conventional or non-conventional structures. In some cases, the configuration of sole system 110 can be selected according to one or more types of ground surfaces on which sole system 110 may be used. Examples of ground surfaces include, but are not limited to: natural turf, synthetic turf, dirt, as well as other surfaces.

Generally, upper 102 may be any type of upper. In particular, upper 102 may have any design, shape, size and/or color. For example, in embodiments where article 100 is a basketball shoe, upper 102 could be a high top upper that is shaped to provide high support on an ankle. In embodiments where article 100 is a running shoe, upper 102 could be a low top upper. In some embodiments, upper 102 could further include provisions for fastening article 100 to a foot, such as a hook and look system (Velcro, for example) and may include still other provisions found in footwear uppers. In the embodiment shown in FIG. 1, a lacing system, or fastener (not shown) may be used for fastening article 100 after a foot enters foot receiving portion 114 of upper 102.

In different embodiments, upper 102 could be made of different materials. Some embodiments of upper 102 include a textile material made of leather, synthetic material (such as plastic or synthetic leather), mesh, or a combination thereon. In the embodiment of FIG. 1, upper 102 may be made of leather or a synthetic leather material.

Referring again to FIG. 1, for purposes of reference, upper 102 may be divided into forefoot portion 10, midfoot portion 12 and heel portion 14. Forefoot portion 10 may be generally associated with the toes and joints connecting the metatarsals with the phalanges. Midfoot portion 12 may be generally associated with the metatarsals of a foot. Likewise, heel portion 14 may be generally associated with the heel of a foot, including the calcaneus bone. In addition, upper 102 may include lateral side 16 and medial side 18. In particular, lateral side 16 and medial side 18 may be opposing sides of article 100. Furthermore, both lateral side 16 and medial side 18 may extend through forefoot portion 10, midfoot portion 12 and heel portion 14. It will be understood that forefoot portion 10, midfoot portion 12 and heel portion 14 are only intended for purposes of description and are not intended to demarcate precise regions of upper 102. Likewise, lateral side 16 and medial side 18 are intended to represent generally two sides of upper 102, rather than precisely demarcating upper 102 into two halves. As shown in FIG. 1, article of footwear 100 is intended to be used with a right foot; however, it should be understood that the following description may equally apply to a mirror image of article of footwear 100 that is intended for use with a left foot (not shown).

For consistency and convenience, directional adjectives are employed throughout this detailed description corresponding to the illustrated embodiments. The term "distal" as used throughout this detailed description and in the claims refers to a direction directed away from article 100, while the term "proximal" as used throughout this detailed description and in the claims refers to a direction directed towards article 100. It will be understood that each of these directional adjectives may be applied to individual components of an article, such as an upper and/or a sole structure.

Referring to FIG. 1, article of footwear 100 may include a plurality of printed structures 200. The term "printed structure" as used throughout this detailed description refers to any structure that may be formed by a printing process, such as a three-dimensional printing process. Printed structures 200 may be provided on an article with a variety of different material characteristics, geometries and/or other properties. In at least some embodiments, printed structures 200 could be engaged by other components or features of the article.

In some embodiments, printed structures 200 are printed at least partially onto upper 102 by a printer (shown later). In some embodiments, printed structures 200 may be printed onto an upper using a three-dimensional printer. The term "three-dimensional printer" as used throughout this detailed description and in the claims refers to a printing apparatus capable of printing or disposing a printable material that forms a three-dimensional object. A printable material could be any color such as red, blue, green, yellow, white, black, or a combination thereof. A printable material could also be made of acrylic, plastic, or any other substance or toner known in the art for printing a three-dimensional object from a three-dimensional printer.

In the embodiment depicted in FIG. 1, printed structures 200 may take the form of fastener receiving members. The term "fastener receiving member" as used throughout this detailed description and in the claims refers to a component or structure that is configured to receive or otherwise engage with portions of a lace, cord, or other kind of fastener. A fastener receiving member could be a fastener receiving member in some embodiments. In the exemplary embodiment, printed structures 200 may act to secure a lacing system (for example, a shoe lace) or other fastener to portions of upper 102.

Figure 4:
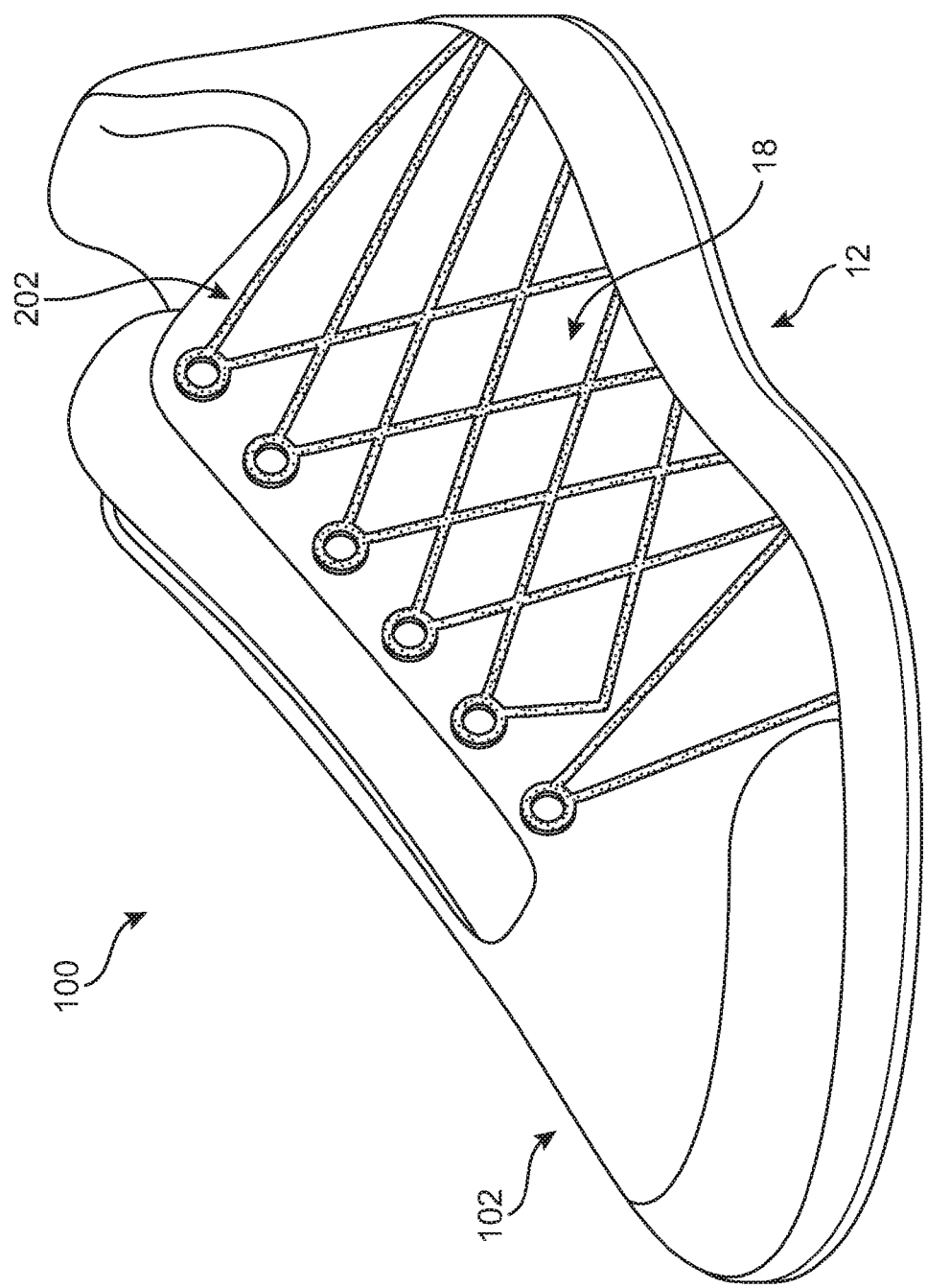
FIG. 4 is an isometric side view of an embodiment of an article of footwear showing the medial side of the article having printed structures.

Referring to FIG. 1, printed structures 200 may be disposed on lateral side 16 and on medial side 18. Also, printed structures 200 could be disposed on forefoot portion 10, midfoot portion 12, and/or heel portion 14. In FIG. 1, printed structures 200 are generally printed on midfoot portion 12. In the exemplary embodiment, printed structures 200 includes a first printed structure 201 on lateral side 16, herein referred to simply as printed structure 201, as well as a second printed structure 202 on medial side 18. FIG. 4 illustrates article 100 having printed structures 200 with second printed structure 202 on medial side 18. It will be understood that second printed structure 202 could vary in any manner, and may include any of the features described in this embodiment for first printed structure 201.

First printed structure 201 may include extended portions 220 and fastener receiving portions 230. As shown in FIG. 1, extended portions 220 includes several portions of printable material generally extending along upper 102. For example, extended portions 220 may include first extended portion 225 and second extended portion 226. Fastener receiving portions 230 may include several printed loop structures having apertures 240, and may generally be attached to extended portions 220. For example, first loop structure 231 includes first aperture 241. In other embodiments, fastener receiving portions 230 may include loop structures that are square or rectangular in shape. In the embodiment shown in FIG. 1, fastener receiving portions 230 includes loop structures that are generally rounded. With this configuration, fastener receiving portions 230, including apertures 240, may function as eyelets for receiving a lace or other similar fastener.

As shown in FIG. 1, both first extended portion 225 and second extended portion 226 are connected to fastener receiving portions 230 at top portion 103 of upper, and extend along upper 102 to sole system 110. In other embodiments, first extended portion 225 and second extended portion 226 extend partially along upper 102. Also, in some embodiments, only first extended portion 225 may be connected to first loop structure 231. In other words, in some embodiments, only a single extended portion may be connected to a loop structure. In other embodiments, three or more extended portions could be connected to first loop structure 231.

In FIG. 1, first extended portion 225 and second extended portion 226 are generally linear, that is, straight in their configuration. In other embodiments, first extended portion 225 and/or second extended portion 226 could be non-linear. For example, first extended portion 225 and second extended portion 226 could each have a wavy or zig-zag configuration. Still, other embodiments could include any other geometries for extended portions of first printed structure 201.

Figure 3:
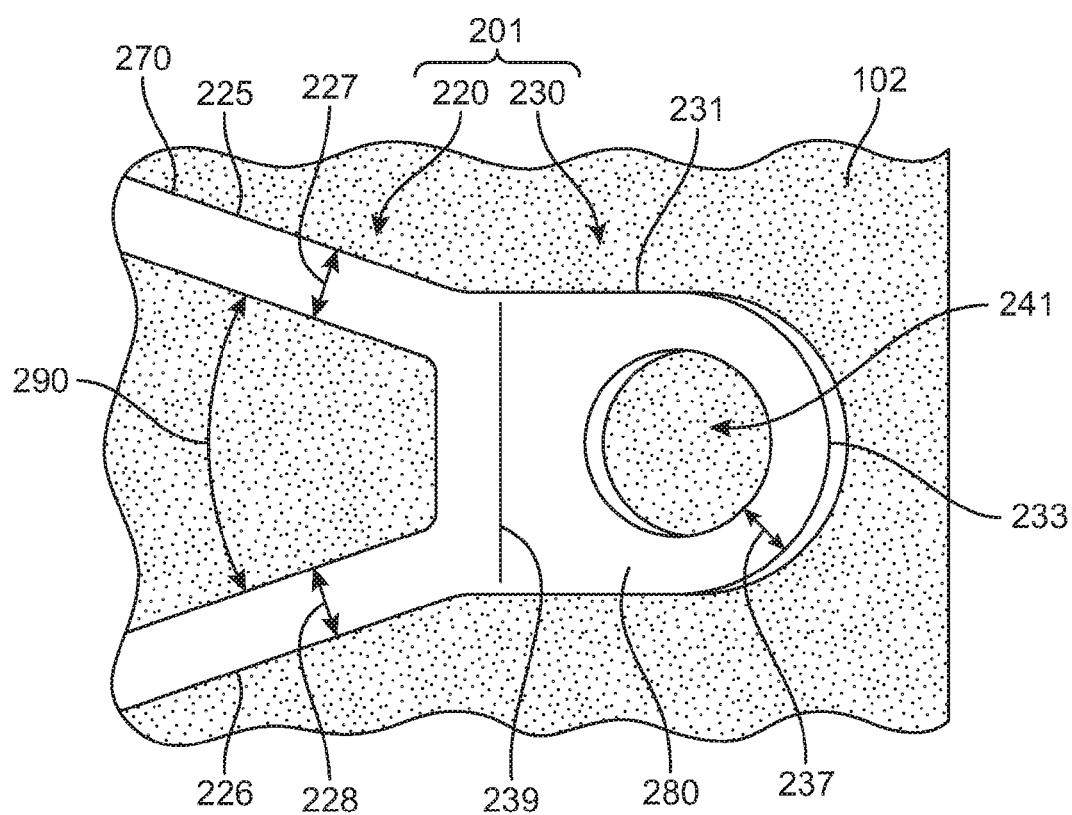
FIG. 3 is an enlarged top view of the embodiment in FIG. 1, showing an extended portion and a fastener receiving portion.

In different embodiments, the dimensions of each extended portion could vary. As shown in FIG. 3, in the exemplary embodiment, first extended portion 225 and second extended portion 226 may have first width 227 and second width 228, respectively. First width 227 and second width 228 may each be approximately in the range between 1 mm and 8 mm. In the embodiment shown in FIG. 1, first width 227 and second width 228 each have a uniform width. However, in other embodiments, first width 227 could vary along first extended portion 225, and/or second width 228 could vary along second extended portion 226.

Generally, the extended portions of printed structure 201 may be arranged in any configuration. In some embodiments, one or more extended portions could intersect at one or more locations. In at least some embodiments, some extended portions may be angled with respect to one another, thereby creating intersections between adjacent extended portions. First extended portion 225 and second extended portion 226 may be angled with respect to one another (i.e., non-parallel) in some embodiments. For example, first extended portion 225 has a first end 380 at first loop structure 231, adjacent lacing region 105, and a second end 381 proximate sole system 110. Second extended portion 226 has a first end 382 attached to first loop structure 231, adjacent lacing region 105, and a second end 383 proximate sole system 110. As seen in FIG. 1, second end 381 and second end 383 are spaced further apart than first end 380 and first end 382. As shown in the embodiment of FIG. 1, this arrangement provides an angle 290 between first extended portion 225 and second extended portion 226 such that both first extended portion 225 and second extended portion 226 intersect other extended portions. This may be done to create extended portions 220 having additional strength against tearing, breaking, and/or to create a certain desired visual or aesthetic effect. Although the above discussion is directed to angle 290 between first extended portion 225 and second extended portion 226, it will be understood that other segmented portions of printed structure 201 could be arranged in any manner discussed above. Moreover, in other embodiments, the angle between any two extended portions attached to a common fastener receiving portion can be varied such that the extended portions intersect or do not intersect other adjacent extended portions of a printed structure.

When individual extended portions intersect, they may form a grid-like structure or pattern on upper 102. For example, in FIG. 1, first extended portion 225 and second extended portion 226 each intersect with multiple extended portions. As a result, the remaining areas between extended portions 220 include several diamond-shaped structures. Of course, these diamond-shaped structures may vary in dimension when angle 290 changes. In some embodiments, the intersecting points, that is, the points where individual extended portions intersect, may receive additional printable material as one extended portion is printed over another extended portion. In the embodiment shown in FIG. 1, an exemplary intersecting point 229 does not receive additional printable material. In other words, in FIG. 1, the three-dimensional printer does not print additional printable material over an existing extended portion at the intersecting points.

The length or longitudinal extension of extended portions could vary in different embodiments. In the exemplary embodiment, each extended portion may generally extend from the top of the upper near the lacing region to a lower periphery of the upper near the sole structure. However, in other embodiments one or more extended portions may not extend all the way to the lower periphery of the upper. In one alternative embodiment, it is contemplated that one or more extended portions may have a length approximately in the range between 0.5 to 3 times the approximate size (e.g., diameter) of a corresponding fastener receiving portion. The length of each extended portion can generally be selected to ensure the extended portion and a corresponding fastener receiving portion attached to the extended portion do not tear away from the upper under a predetermined threshold level of stress. In the exemplary embodiment shown in FIG. 1, first extended portion 225 has a longest dimension 391 (e.g., a length) and first loop structure 231 has a longest dimension 390 (e.g., a diameter). Longest dimension 391 is seen to be greater than longest dimension 390.

In at least some embodiments, fastener receiving portions 230 may be capable of flexing relative to extended portions 220. For example, first loop structure 231 may be capable of flexing relative to first extended portion 225 and second extended portion 226. In some cases, first loop structure 231 could flex about the portions where first loop structure 231 is connected to first extended portion 225 and second extended portion 226. This relative flexing of fastener receiving portions 230 to extended portions 220 may make it easier to insert a lace through fastener receiving portions 230. Also, this flexibility may allow fastener receiving portions 230 to adjust dynamically to changes in tension applied by a lace.

In some embodiments (shown later), fastener receiving portions 230 may be formed by printing. In some embodiments, fastener receiving portions 230 may be printed directly onto upper 102 or may be printed onto a release layer. In the embodiments shown in FIGS. 1-3, fastener receiving portions 230 are generally not printed directly onto upper 102, but are printed instead onto extended portions 220 such that fastener receiving portions 230 are spaced apart, or disposed away, from the surface of upper 102.

In some embodiments, the loop structures of fastener receiving portions 230 may each include apertures 240. First loop structure 231 in FIGS. 1-3 includes first aperture 241 that is generally circular but could vary in other embodiments. Whereas some articles of footwear have apertures in an upper to receive a lace or other fastener, the embodiment of article 100 shown in FIG. 1 includes apertures 240 for receiving a lace or other component of a fastening system. It should be understood that the printable material used in extended portions 220 and fastener receiving portions 230 may be sufficiently strong to withstand tearing and/or breaking from sheer forces or other stresses generally encountered while article of footwear 100 is worn. Further, extended portions 220 and fastener receiving portions 230 could differ in strength. The term "strength" as used in this detailed description and in the claims refers to the ability of a structure or material to resist breaking and/or tearing. Material strength could include tensile strength, compressive strength and/or shear strength. In some embodiments, fastener receiving portions 230 could be made of a stronger (e.g., higher tensile strength, compressive strength and/or shear strength) material than that of extended portions 220. In other embodiments, extended portions 220 could be made of a stronger material than that of fastener receiving portions 230. Still, in other embodiments, fastener receiving portions 230 could be made of a material with the same strength as that of extended portions 220. Since fastener receiving portions may be under a great deal of tensile stress during use, as a lace tugs on the fastener receiving portions, the embodiments of FIGS. 1-3 may be characterized by fastener receiving portions 230 having a greater tensile strength than extended portions 220. However, fastener receiving portions 230 could also be configured with greater compressive strength and/or shear strength than extended portions 220. For example, due to possible torsion stresses applied to fastener receiving portions 230 by a lace, fastener receiving portions 230 may have a higher shear strength than extended portions 220, which may not undergo much torsion as they are bonded to the surface of the upper.

As shown in FIG. 3, first loop structure 231 may have width 237. In some embodiments, width 237 of first loop structure 231 may be approximately in the range between 1 mm and 1 cm. In the exemplary embodiment shown in FIG. 3, width 237 may be similar to first width 227 and second width 228.

Figure 2:
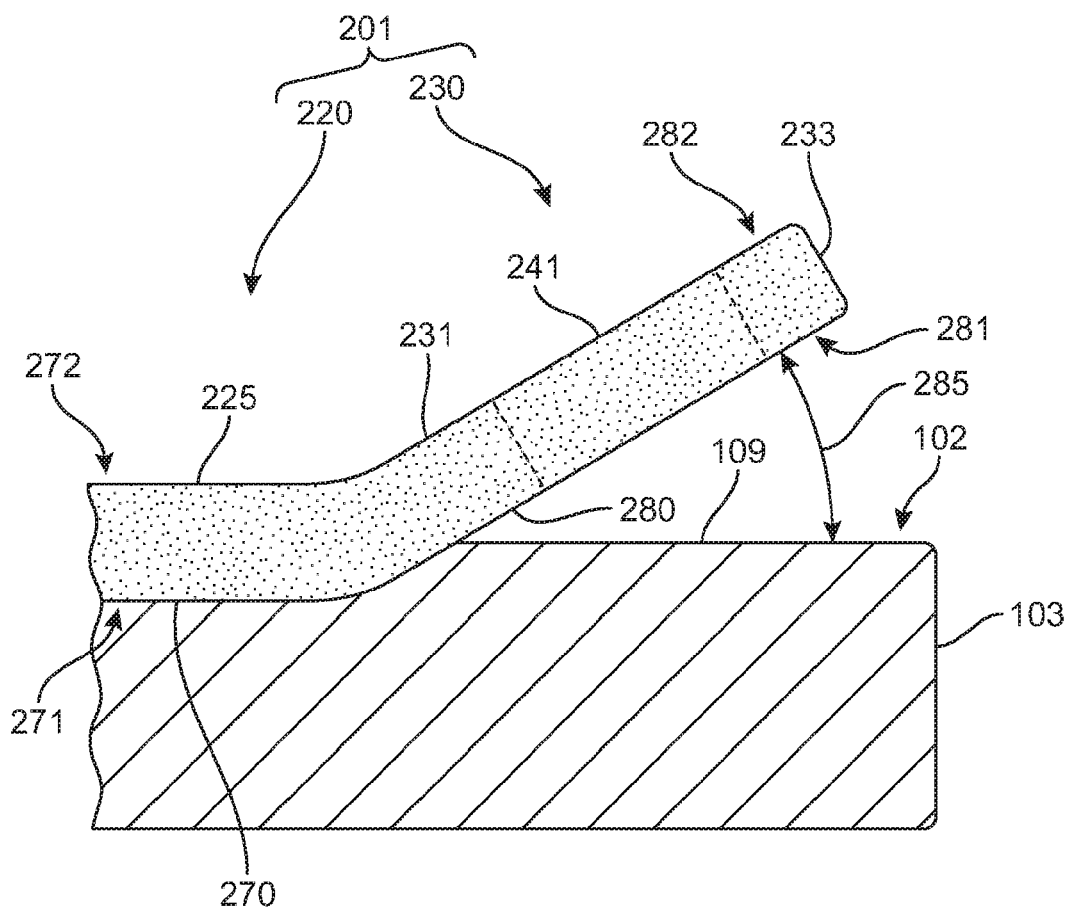
FIG. 2 is an enlarged schematic cross-sectional view of the embodiment shown in FIG. 1, showing an extended portion and a fastener receiving portion.

In order to attach to upper 102 and/or withstand additional tearing or breaking, at least some portions of first printed structure 201 may be partially embedded in upper 102. Referring to FIGS. 2 and 3, first printed structure 201 may be characterized as having an attached portion 270 and a free portion 280. The term "attached portion" as used throughout this detailed description and in the claims refers to a portion that is in direct contact with, and attached to, an upper. In contrast, the term "free portion" as used throughout this detailed description and in the claims refers to a portion that can be pulled away from, or moved with respect to, the upper without any tearing, breaking, or detachment of the free portion from the upper. As shown in FIGS. 2 and 3, free portion 280 generally begins when the printable material is no longer partially embedded in upper 102, generally near a crease 239 in printed structures 200.

Printed structures may include attached portions and/or free portions. Moreover, extended portions of a printed structure (e.g., extended portions 220) could comprise attached portions, free portions or combinations thereof. Likewise, fastener receiving portions of a printed structure (e.g., fastener receiving portions 230) could comprise attached portions, free portions or combinations thereof.

In the embodiment illustrated in FIGS. 2 and 3, attached portion 270 may include first extended portion 225. Likewise, free portion 280 may include first loop structure 231 and first aperture 241. Thus it will be understood that in the exemplary embodiment, extended portions 220 of printed structure 201 may generally comprise attached portions, while fastener receiving portions 230 of printed structure 201 may generally comprise free portions. However, it may be understood that in some other embodiments, some parts of an extended portion could be free portions (i.e., not attached to the upper). Likewise, in some other embodiments, some parts of a fastener receiving portion could be an attached portion.

In order to further characterize the relationship between attached portion 270 of printed structure 201 and free portion 280 of first printed structure 201, FIG. 2 illustrates attached portion 270 partially embedded in upper 102. Attached portion 270 may generally be embedded to a depth approximately in the range between 0.1 mm and 5 mm below exterior surface 109 of upper 102. The printable material forming attached portion 270 may absorb into porous regions of upper 102 and bond with individual fibers in upper 102 before the printable material cures. The term "cure" or "curing" as used throughout this detailed description and in the claims refers to a process of treating and/or drying. Also, after curing, extended portions 220 may be disposed above upper 102 to a height approximately in the range between 0.5 mm and 5 mm.

FIG. 2 further shows first printed structure 201 having first surface 271 of attached portion 270 extending below exterior surface 109 of upper 102, and second surface 272 of attached portion 270 extending above the exterior surface 109 of upper 102. In this case, first surface 271 may be a proximally oriented surface (i.e., oriented towards the interior of article 100) while second surface 272 may be a distally oriented surface (i.e., oriented away from the interior of article 100). Whereas attached portion 270 may be bonded to upper 102, free portion 280 may generally be free of any bonding with individual fibers of upper 102. In other words, both a first surface 281 of free portion 280 and a second surface 282 of free portion 280 extend above exterior surface 109 of upper 102. In this case, first surface 281 may be seen to be a proximally oriented surface, while second surface 282 may be seen to be a distally oriented surface. In addition, free portion 280 may be further characterized as being spaced apart from upper 102 at least some angular distance 285 between free portion 280 and upper 102. Here, angular distance 285 is measured from first surface 281 of free portion 280 to exterior surface 109 of upper 102. Angular distance 285 is not intended to demarcate a particular distance between free portion 280 and upper 102, and could vary in the embodiment shown in FIG. 2.

Free portion 280 further includes an end portion having a dimensional relationship that may vary with respect to top portion 103 of upper 102. For example, FIGS. 2 and 3 show top portion 103 extending beyond first end portion 233 of first loop structure 231. In other embodiments, first end portion 233 may extend beyond top portion 103. Still, in other embodiments, neither top portion 103 nor first end portion 233 extend beyond one another.

This configuration may allow the attached portions of a printed structure (e.g., attached portion 270) to anchor the printed structure to an upper while allowing the free portions of the printed structure (e.g., free portion 280) to be unattached or bonded to the upper.

In other embodiments, an upper may have printed structures with both the extended portions and the fastener receiving portions partially attached to the upper. For example, in the embodiment shown in FIG. 5, article of footwear 300 includes upper 302 having printed structure 400 on lateral side 16. Printed structure 400 includes extended portions 420 and fastener receiving portions 430. Here, both extended portions 420 and fastener receiving portions 430 are attached portions. In other words, both extended portions 420 and fastener receiving portions 430 are at least partially bonded with individual fibers (not shown) of upper 302 and are generally not free to move relative to upper 302. In this embodiment, fastener receiving portions 430 may generally be permanently aligned with apertures 305 of upper 302 and may provide additional support against stresses, tearing, and/or breaking of apertures 305. Also, printed structures 400 on a medial side (not shown) of article 100 could vary in any manner as described in this embodiment for lateral side 16.

Although extended portions 420 and fastener receiving portions 430 are partially embedded in upper 302, the top surfaces of fastener receiving portions 430 are also disposed at a height above upper 302. The height and embedded depth could vary in any manner described for extended portions 220 (in FIGS. 1-3). In some embodiments, the height of fastener receiving portions 430 above upper 302 is greater than the height of extended portions 420 above the exposed surface of upper 302. In other embodiments, the height of fastener receiving portions 430 above upper 302 is less than the height of extended portions 420 above upper 302. In the embodiment shown in FIG. 5, the height of fastener receiving portions 430 above upper 302 is generally similar to the height of extended portions 420 above upper 302. Also, extended portions 420 include first extended portion 425 and second extended portion 426. Angle 490 between first extended portion 425 and second extended portion 426 could vary in any manner as described in the previous embodiment shown in FIG. 1.

Figure 5:
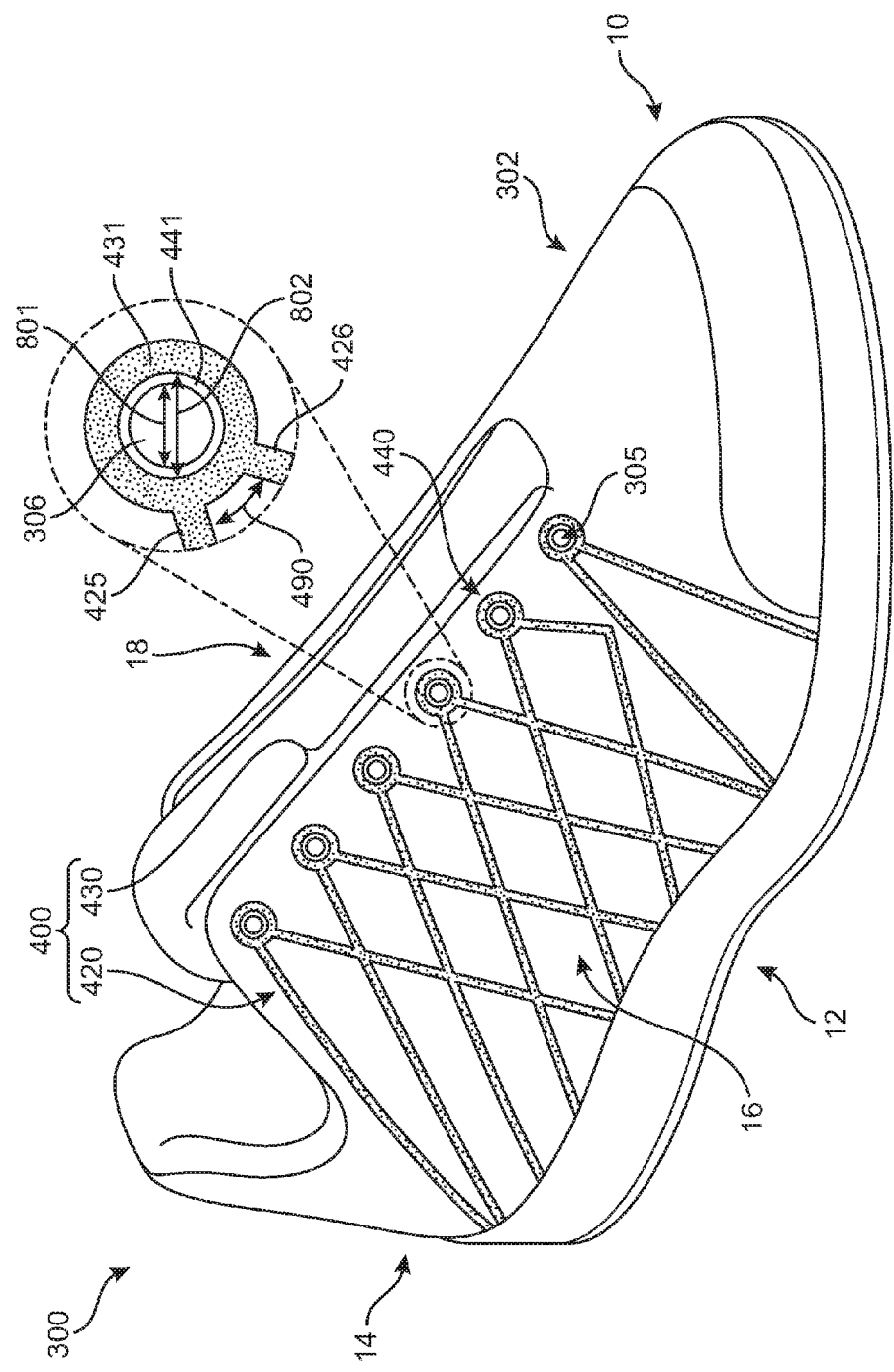
FIG. 5 is an isometric side view of another embodiment of an article of footwear showing the lateral side of the article having printed structures.

FIG. 5 also illustrates a close-up view of upper 302 showing the relationship between apertures 440 of fastener receiving portions 430 and apertures 305 of upper 302. For example, upper 302 includes first aperture 306 having diameter 801. First loop structure 431 has first aperture 441 with diameter 802. Generally, diameter 802 of first aperture 441 is at least as large as diameter 801 of first aperture 306. In the embodiment shown in FIG. 5, diameter 802 of first aperture 441 is larger than diameter 801 of first aperture 306. This configuration allows a lace to be inserted through both first aperture 306 of upper 302 and first aperture 441 of first loop structure 431.

Figure 6:
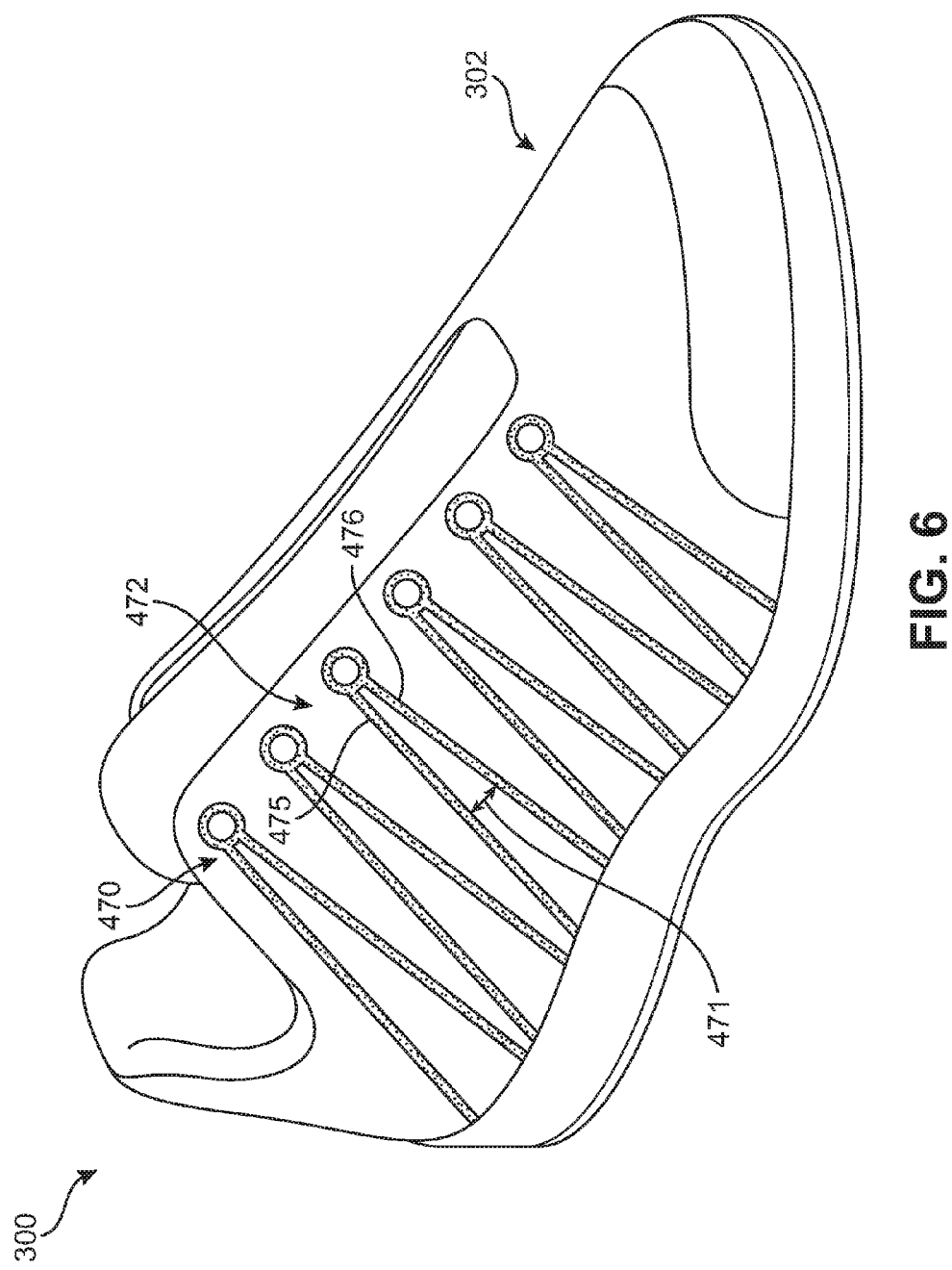
FIG. 6 is an isometric side view of another embodiment of an article of footwear showing the lateral side of the article having a different arrangement of printed structures.

FIG. 6 is an alternative embodiment of article 300 with printed structures 470 arranged in a different configuration or pattern than the pattern illustrated in the embodiment of FIG. 5. Here, printed structures 470 may also include extended portions 472 having first extended portion 475 and second extended portion 476, where angle 471 between first extended portion 475 and second extended portion 476 is sufficiently small such that neither first extended portion 475 nor second extended portion 476 intersect with any other extended portions on upper 302. This embodiment illustrates a more simplified version of extended portions 472 which may reduce manufacturing time.

In some embodiments, as previously described, printed structures may be formed using a three-dimensional printing process to dispose the printed structures on an upper. However, in other embodiments, the structures could be disposed on an upper by means other than a three-dimensional printer. For example, other embodiments could use ultrasonic welding or radio frequency welding in order to create an upper having extended portions and fastener receiving portions. Still other embodiments could use other heating methods to melt and bond extended portions and/or fastener receiving members onto an upper.

Figure 7:
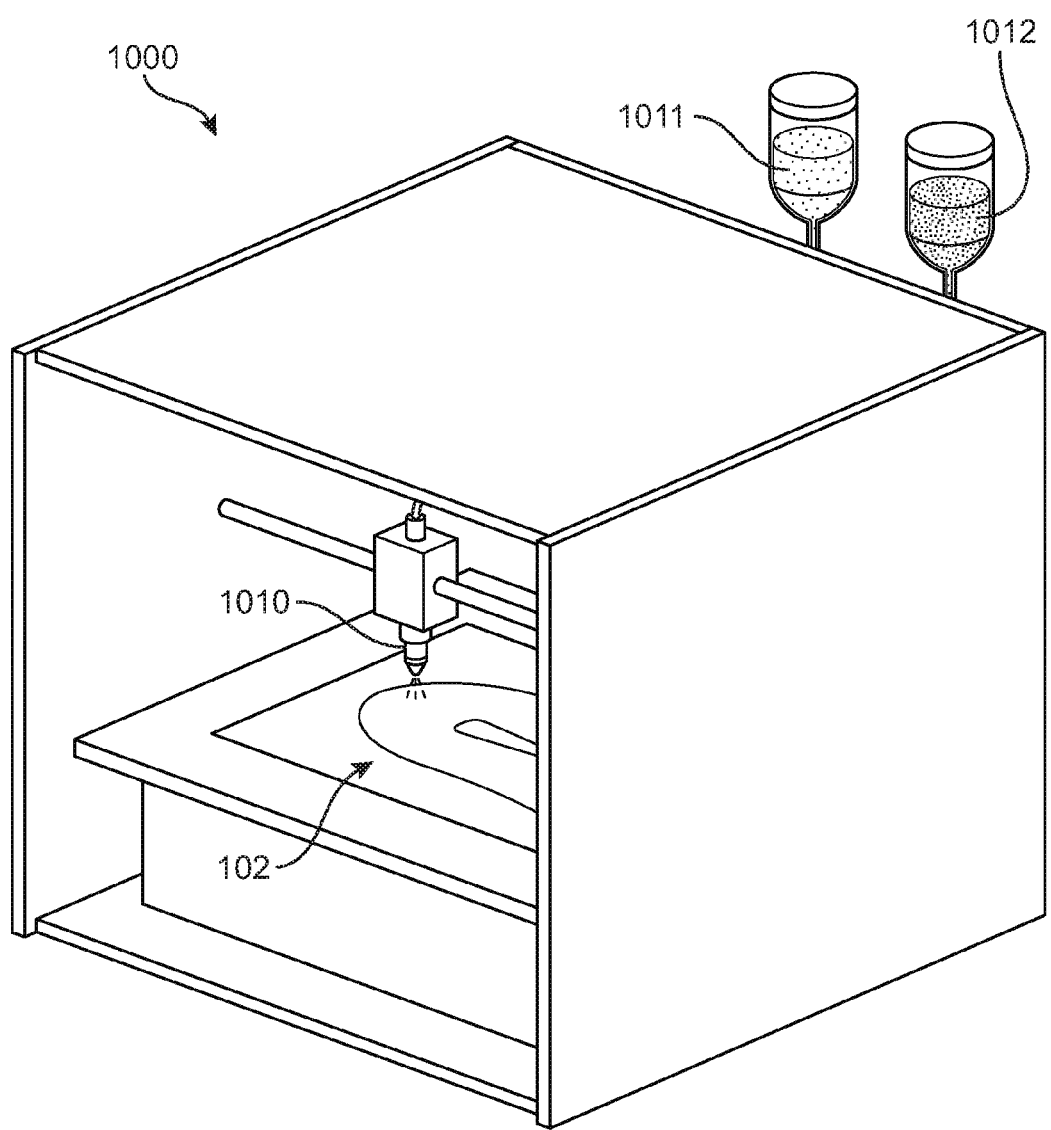
FIG. 7 is a schematic view of an embodiment of a three-dimensional printer.

FIG. 7 illustrates three-dimensional printer 1000 with upper 102 within three-dimensional printer 1000. Three-dimensional printer 1000 could be, for example, a MakerBot® Replicator™ 2. Three-dimensional printer 1000 is connected to a power source (not shown) in order to supply a current to three-dimensional printer 1000. Three-dimensional printer 1000 further includes print head 1010 capable of moving in three dimensions and disposing a printable material forming a three-dimensional object onto upper 102. In the embodiment shown in FIG. 7, print head 1010 is capable of delivering first printable material 1011 and second printable material 1012 onto upper 102. In other embodiments, a first print head and a second print head could be used to dispose a first printable material 1011 and a second printable material 1012, respectively, onto upper 102. Although the embodiment illustrates two separate printable materials, other embodiments could have a three-dimensional printer that prints only a single kind of printable material.

Figure 8:
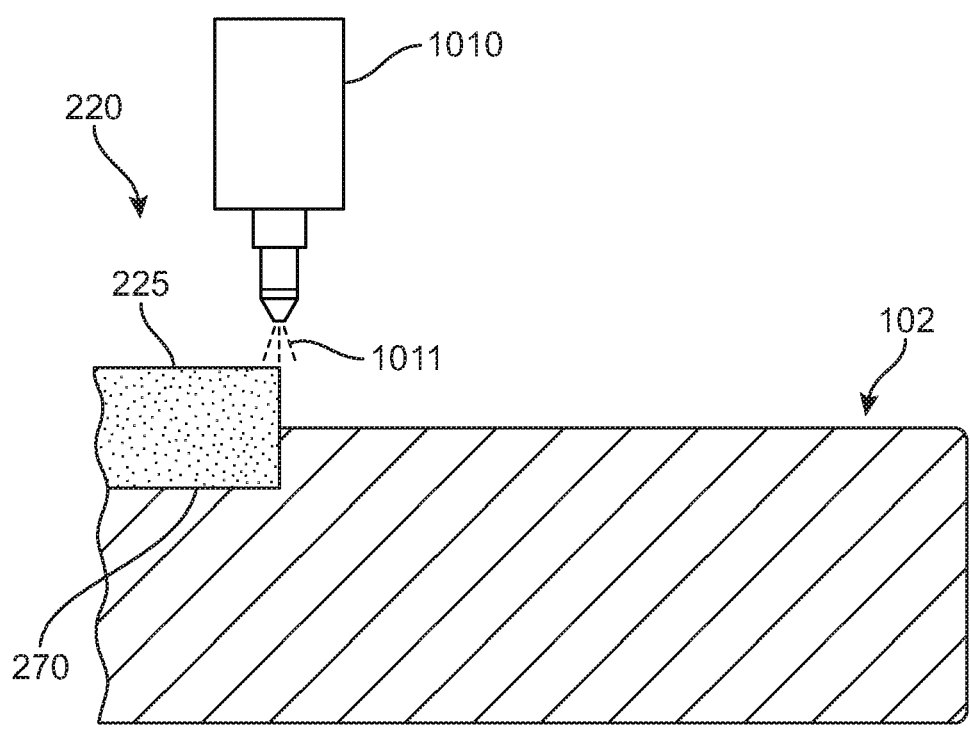
FIG. 8 is an enlarged schematic cross-sectional view showing a method for printing a printed structure onto an upper, according to an embodiment.
Figure 9:
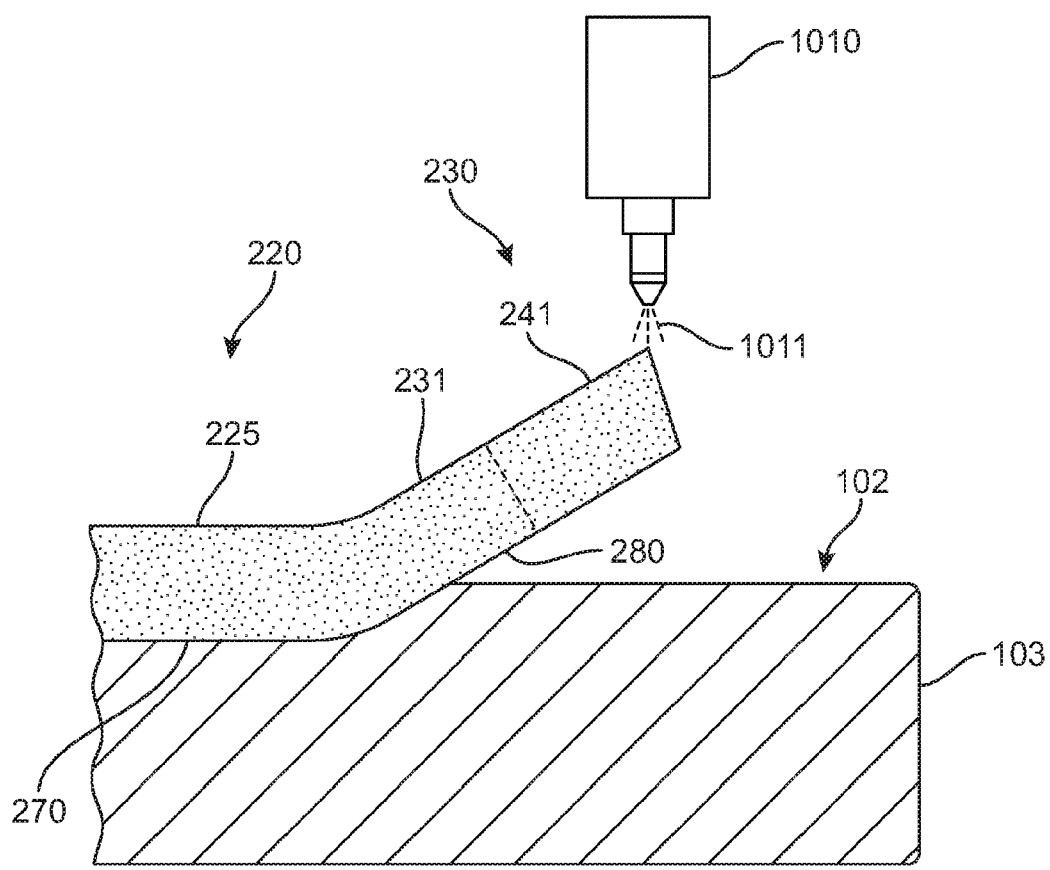
FIG. 9 is an enlarged schematic cross-sectional view further showing the method of FIG. 8, in which the printed structure is partially printed onto the upper.
Figure 10:
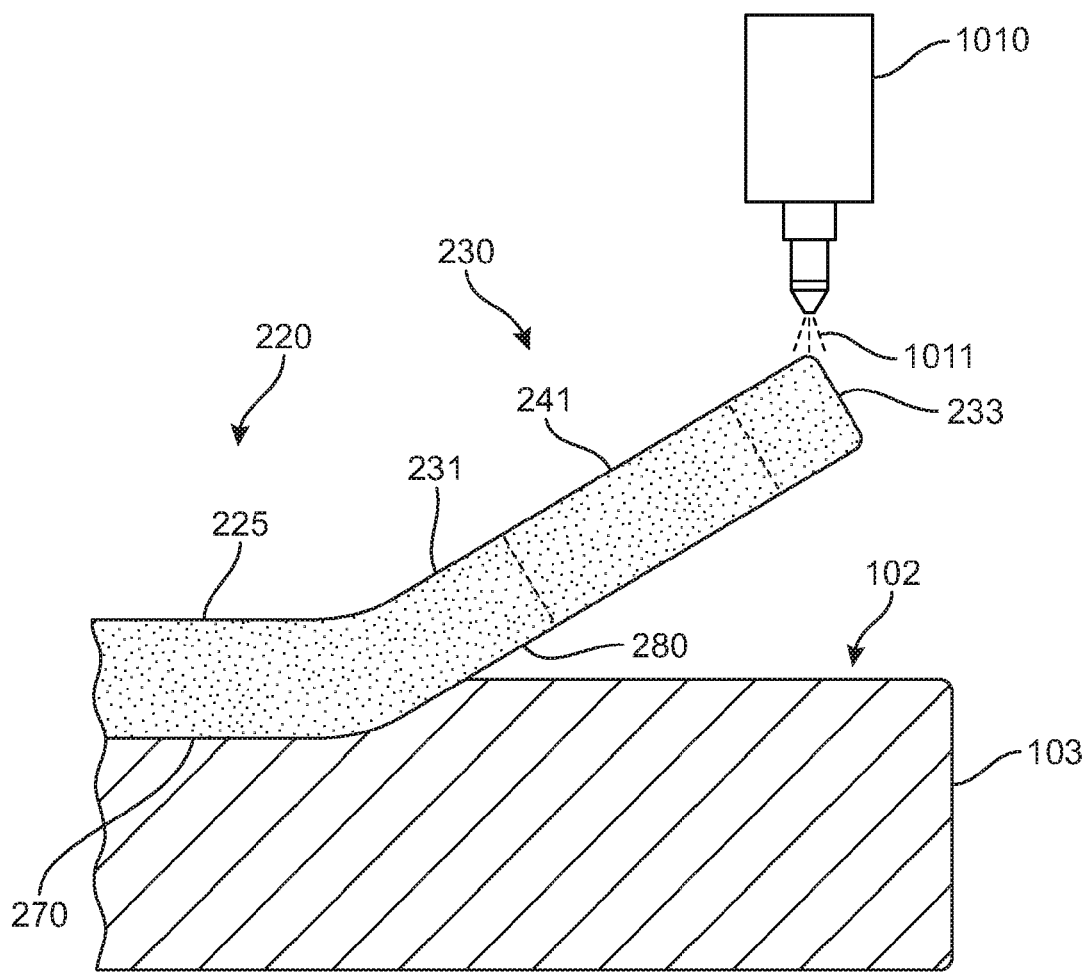
FIG. 10 is an enlarged schematic cross-sectional view further showing the method of FIG. 8, in which the printed structure is fully printed onto the upper.

FIGS. 8-10 illustrate a method of using three-dimensional printer 1000 (see FIG. 7) to create printed structures 200 as shown in FIG. 1. Print head 1010, actuated by a three-dimensional printer, extends along upper 102 in order to disperse first printable material 1011 onto upper 102. Referring to FIG. 8, print head 1010 begins by printing first extended portion 225 of extended portions 220. In some cases, first printable material 1011 may absorb through porous regions of upper 102 and bond with individual fibers of upper 102 before curing, thereby creating attached portion 270. In some cases, the speed of print head 1010 in a direction along upper 102 (i.e., parallel with upper 102) can be controlled to ensure that a sufficient volume of first printable material 1011 is disposed onto a given area of upper 102. The sufficient volume of first printable material 1011 may be selected according to the desired embedded depth and height for first extended portion 225.

FIG. 9 shows print head 1010 continuing to disperse first printable material 1011 while moving along upper 102 and while also moving in a distal direction with respect to upper 102. As seen in FIG. 9, an attached portion 270 in the form of first extended portion 225 is shown as complete and print head 1010 is dispersing first printable material 1011 to create free portion 280 in the form of first loop structure 231 (including aperture 241). Free portion 280 may be spaced apart from upper 102 at an angular distance as described in FIG. 2.

As previously stated, in other embodiments, print head 1010 may disperse second printable material 1012 having different properties than first printable material 1011, such as color, density, and/or strength. For example, second printable material 1012 could have a higher strength and/or density than first printable material 1011. Accordingly, first loop structure 231 of fastener receiving portions 230, being made from, for example, second printable material 1012, could be more resistant to tearing and/or breaking than first extended portion 225 made from first printable material 1011.

As shown in FIG. 10, print head 1010 may move further along upper 102 (i.e., parallel to a surface of upper 102) and further in a distal direction with respect to upper 102. Here, print head 1010 has moved in a direction far enough to print first end portion 233 of first loop structure 231. It should be noted that first aperture 241 may be formed in first loop structure 231 during the printing of first loop structure 231.

Figure 11:
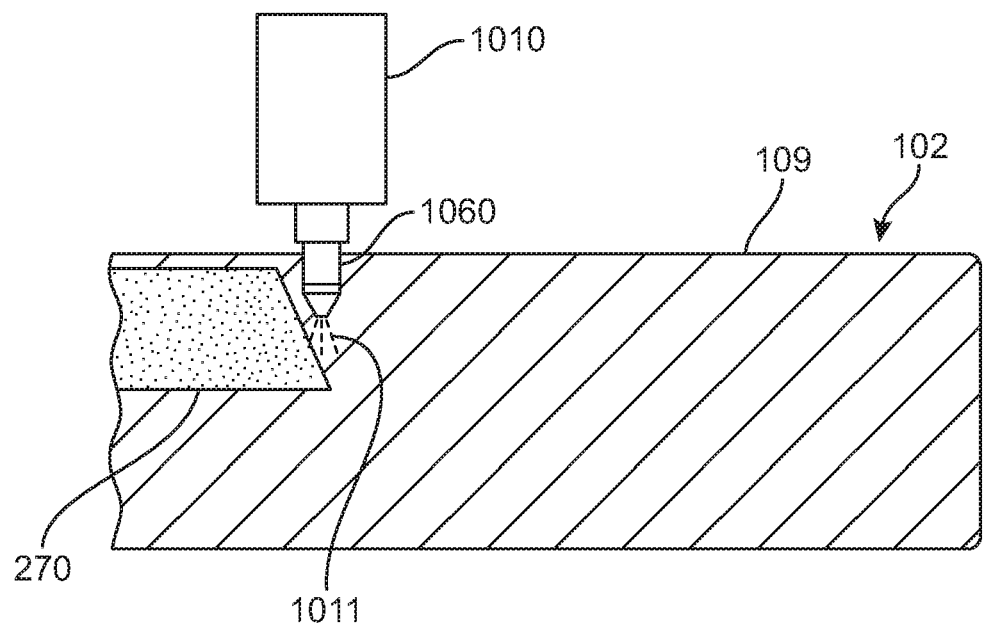
FIG. 11 is an enlarged schematic cross-sectional view showing another method for printing a printed structure onto an upper, according to an embodiment.

In other embodiments of a three-dimensional printing process, print head 1010 may be capable of dispersing first printable material 1011 directly into upper 102 to create attached portion 270. For example, in FIGS. 11-13, three-dimensional printer 1000 (see FIG. 7) has print head 1010 with nozzle 1060 embedded into upper 102 (e.g., below exterior surface 109 of upper 102) while dispersing first printable material 1011 into upper 102. In other embodiments, an alternate print head having an extended nozzle could be used. Rather than first printable material 1011 being printed onto and absorbed into porous regions of upper 102, first printable material 1011 is directly dispersed into portions of upper 102 to form attached portion 270. First printable material 1011 used to print attached portion 270 again bonds with individual fibers of upper 102. In contrast to the embodiment depicted in FIG. 10, the embodiment of FIG. 11 has an attached portion 270 disposed completely beneath exterior surface 109 of upper 102.

Figure 12:
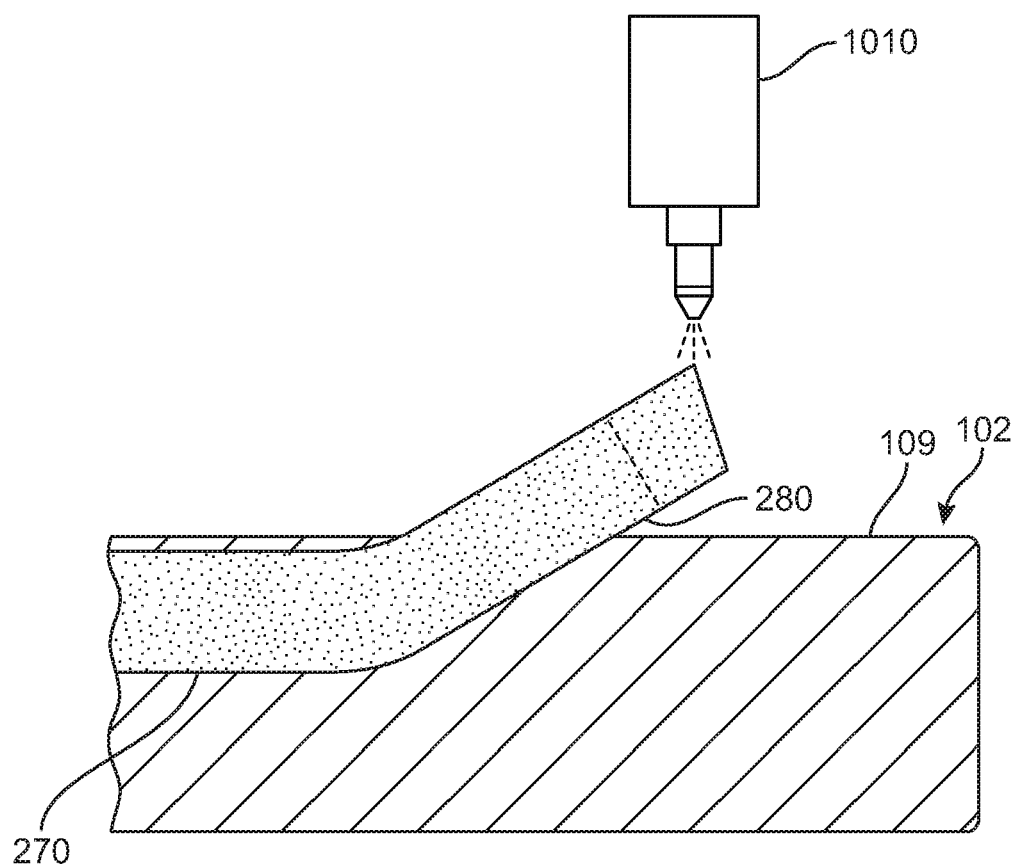
FIG. 12 is an enlarged schematic cross-sectional view further showing the method of FIG. 11, in which the printed structure is partially printed.
Figure 13:
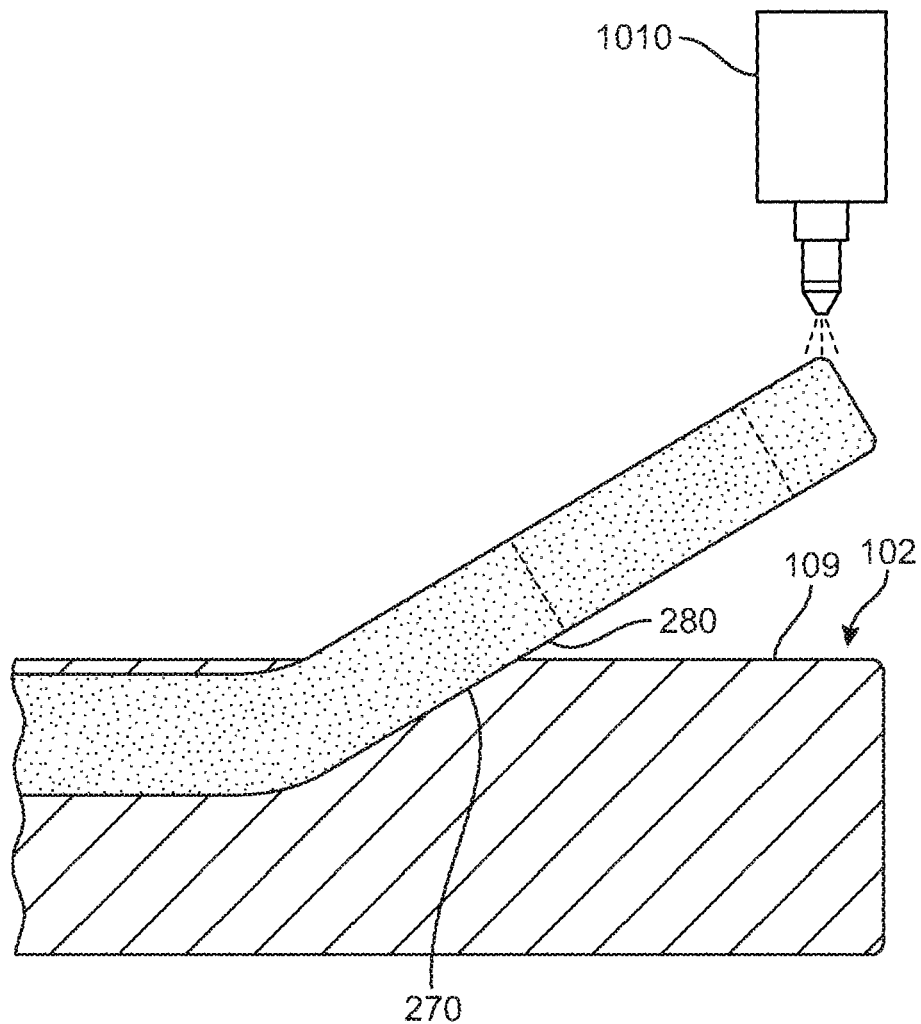
FIG. 13 is an enlarged view further showing the method of FIG. 11, in which the printed structure is fully printed.

As shown in FIG. 12, free portion 280 may generally be formed as print head 1010 is raised away (e.g., moved distally) from exterior surface 109 of upper 102. FIGS. 12 and 13 illustrate print head 1010 disengaging upper 102 and moving in a distal direction with respect to upper 102. Further, free portion 280 may be spaced apart from upper 102 at an angular distance as described above and indicated in FIG. 2.

In yet another method of three-dimensional printing, a release layer could be incorporated into the method of printing three-dimensional objects onto an upper. For example, in the method shown in FIGS. 14-17, release layer 900 may be disposed on upper 502 during the printing method. Release layer 900 is generally a two-sided structure with each side having a surface such that release layer 900 may be disposed on upper 502, and one or more fastener receiving portions may be printed onto release layer 900. However, both surfaces of release layer 900 are generally "non-destructively removable" meaning release layer 900 can be removed from upper 502 and one or more fastener receiving portions without destroying, tearing, and/or breaking either upper 502 and/or fastener receiving portions. In some embodiments, release layer 900 may be opaque or translucent. In the embodiment shown in FIGS. 14-17, release layer 900 is generally transparent. Also, release layer has a height 805 approximately in the range of 0.2 mm to 3 mm, as indicated in FIG. 14.

Figure 14:
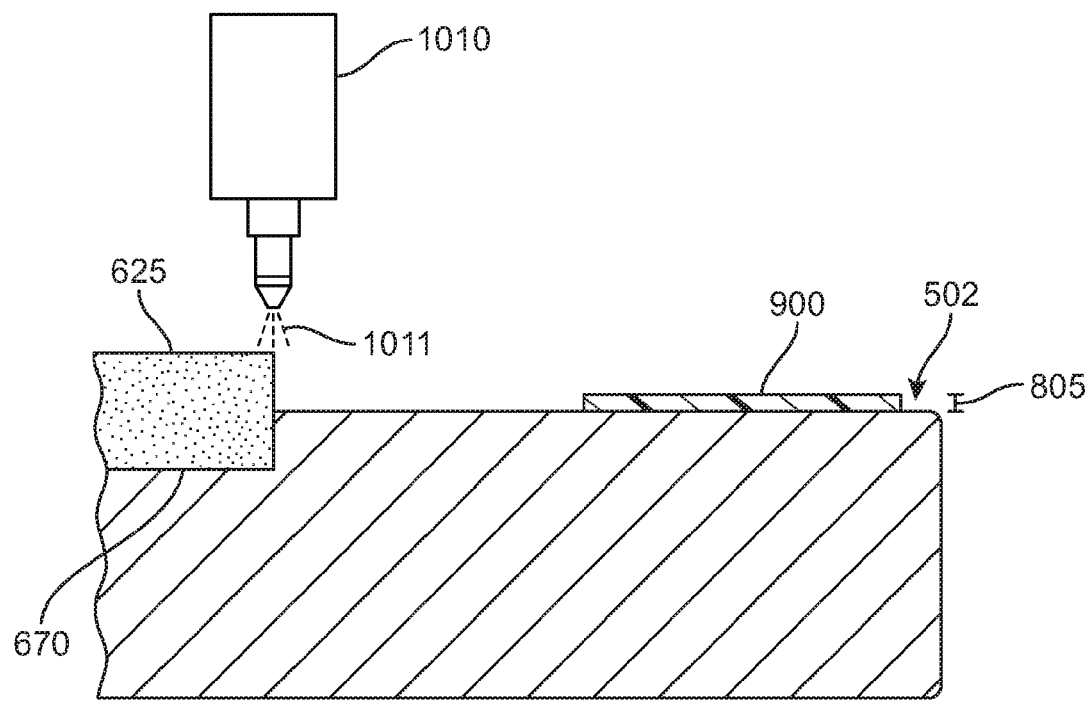
FIG. 14 is an enlarged schematic cross-sectional view showing a method for printing a printed structure onto an upper using a release layer to separate a fastener receiving portion from the upper, according to an embodiment.

FIG. 14 shows print head 1010 dispersing a printable material to form an extended portion 625 onto upper 502. The method of printing extended portion 625 may vary in any manner described in the previous methods for printing. Extended portion 625 bonds with individual fibers of upper 502 to create an attached portion 670 disposed on and bonded to upper 502.

Figure 15:
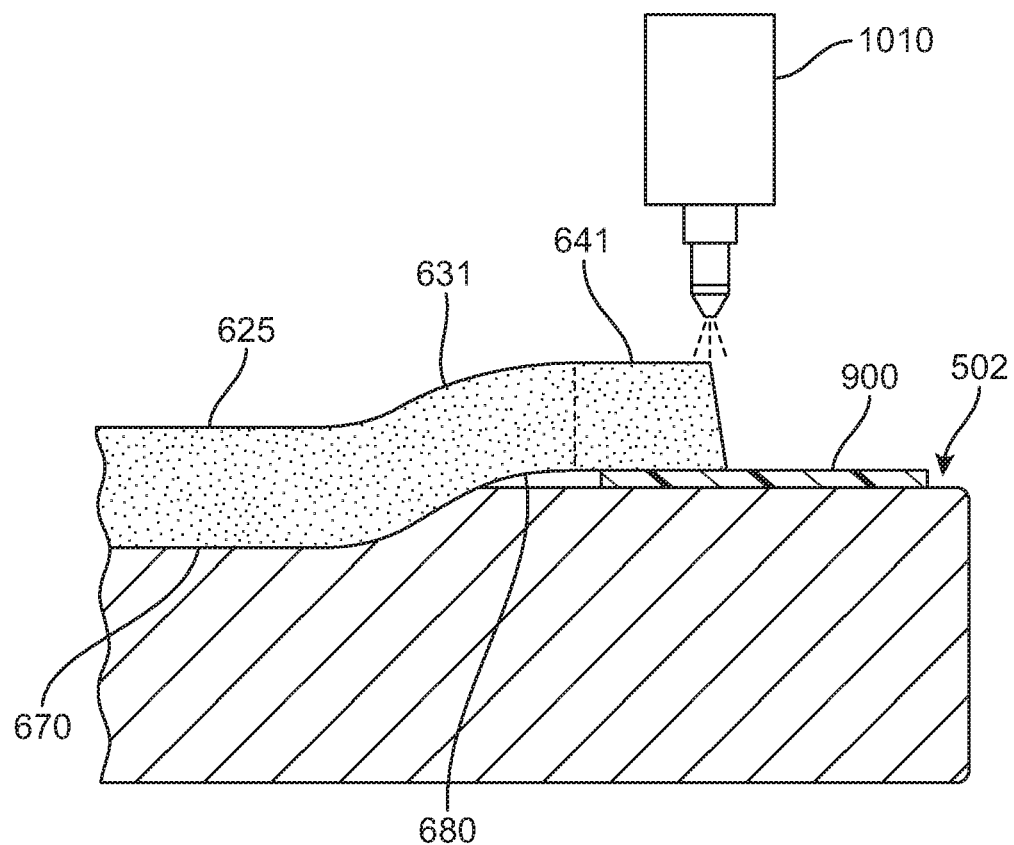
FIG. 15 is an enlarged schematic cross-sectional view further showing the method of FIG. 14, in which the fastener receiving portion is partially printed onto the upper.
Figure 16:
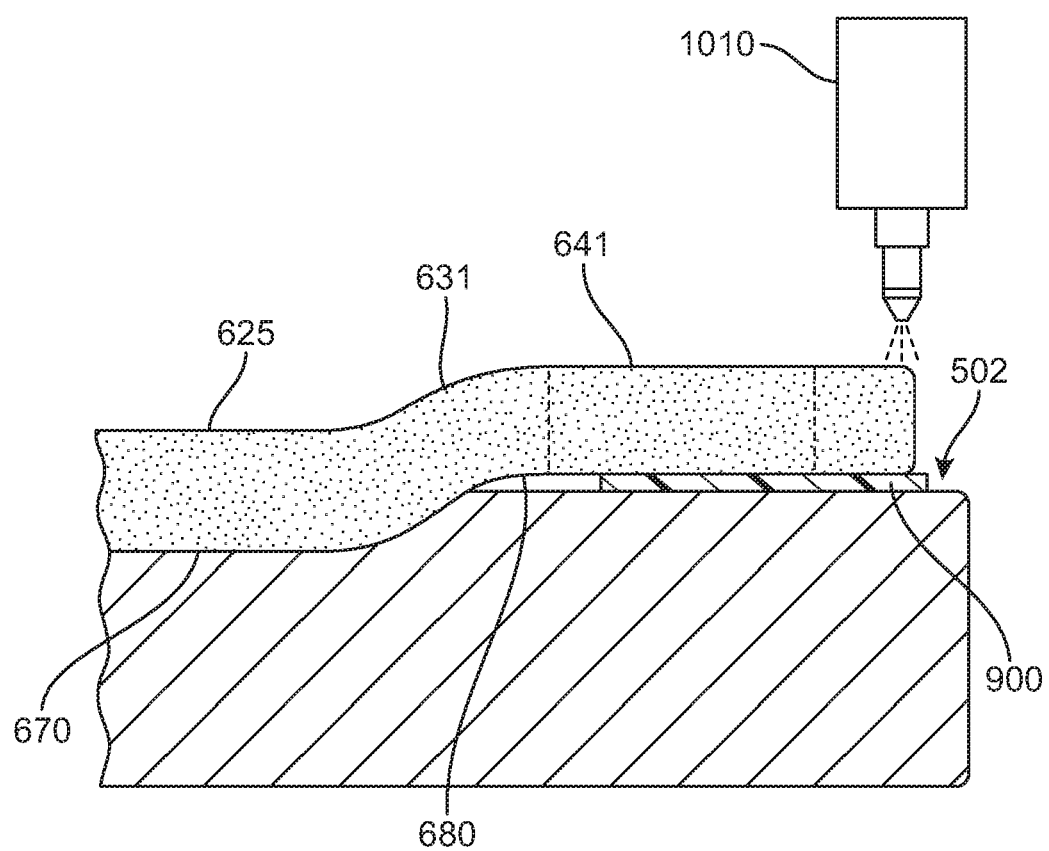
FIG. 16 is an enlarged schematic cross-sectional view further showing the method of FIG. 14, in which the fastener receiving portion is fully printed onto the upper.

The method of printing using release layer 900 incorporates print head 1010 capable of moving along upper 502 as well as in a distal direction with respect to upper 502 as described in previous embodiments. In the embodiment shown in FIGS. 14-17, print head 1010 may move in a direction along upper 502. In some cases, print head 1010 may also move distally with respect to upper 502 as print head 1010 transitions from printing onto upper 502 to printing directly to release layer 900, in order to accommodate the thickness of release layer 900. As seen in FIGS. 15 and 16, fastener receiving portion 631 (with aperture 641) is printed onto release layer 900, thereby forming a free portion 680 that is not directly attached to upper 502.

Figure 17:
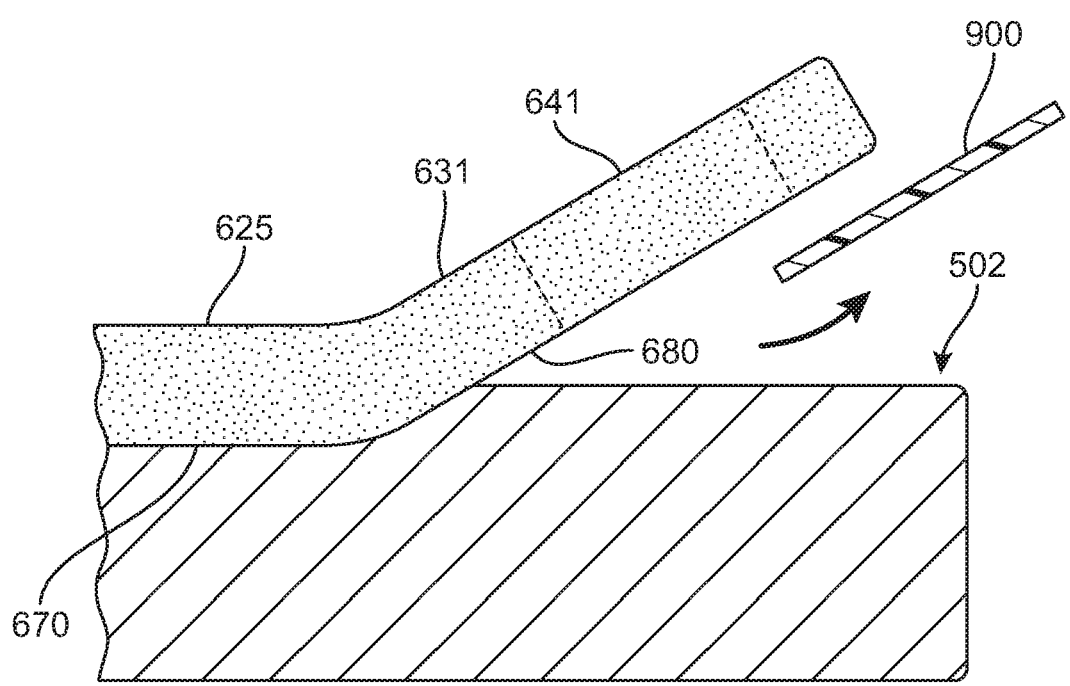
FIG. 17 is an enlarged schematic cross-sectional view further showing the method of FIG. 14, in which the release layer is removed from between the upper and the fastener receiving portion.

As shown in FIG. 17, after fastener receiving portion 631 is printed onto release layer 900, release layer 900 is removed so that fastener receiving portion 631 is generally only attached to extended portion 625. As seen in FIG. 17, once released from contact with release layer 900, fastener receiving portion 631 may be characterized as a free portion 680. Free portion 680 may be spaced apart from upper 502 at an angular distance as described above and indicated in FIG. 2.

In some embodiments, fastener receiving portion 631 could include an aperture 641 for receiving a lace or similar fastener. In at least some embodiments, aperture 641 may be aligned with a corresponding aperture in upper 502. In other embodiments, aperture 641 need not be aligned with an aperture in upper 502.

Figure 18:
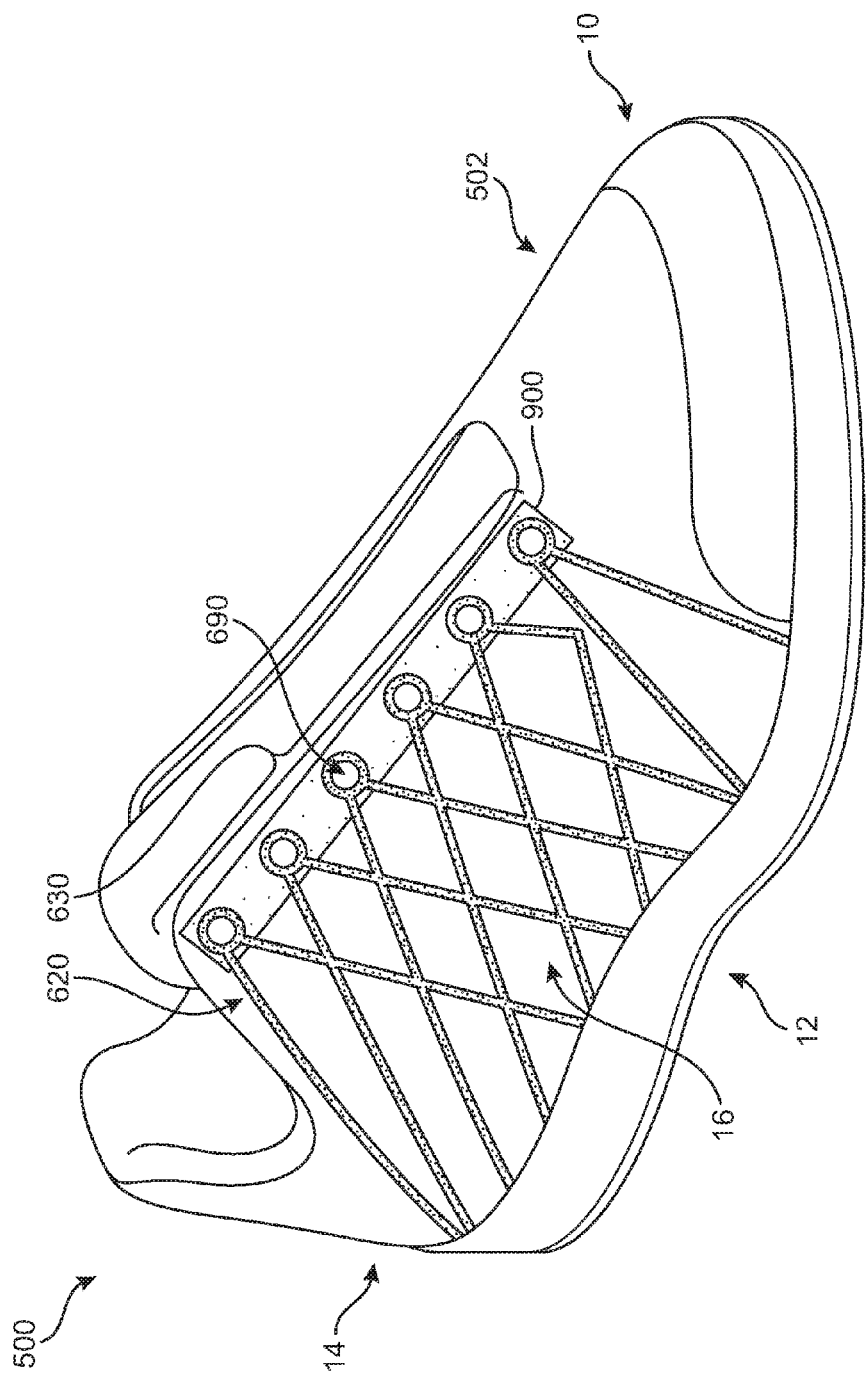
FIG. 18 is a side isometric view of an embodiment of an article of footwear having printed structures made from the method shown in FIGS. 14-17.
Figure 19:
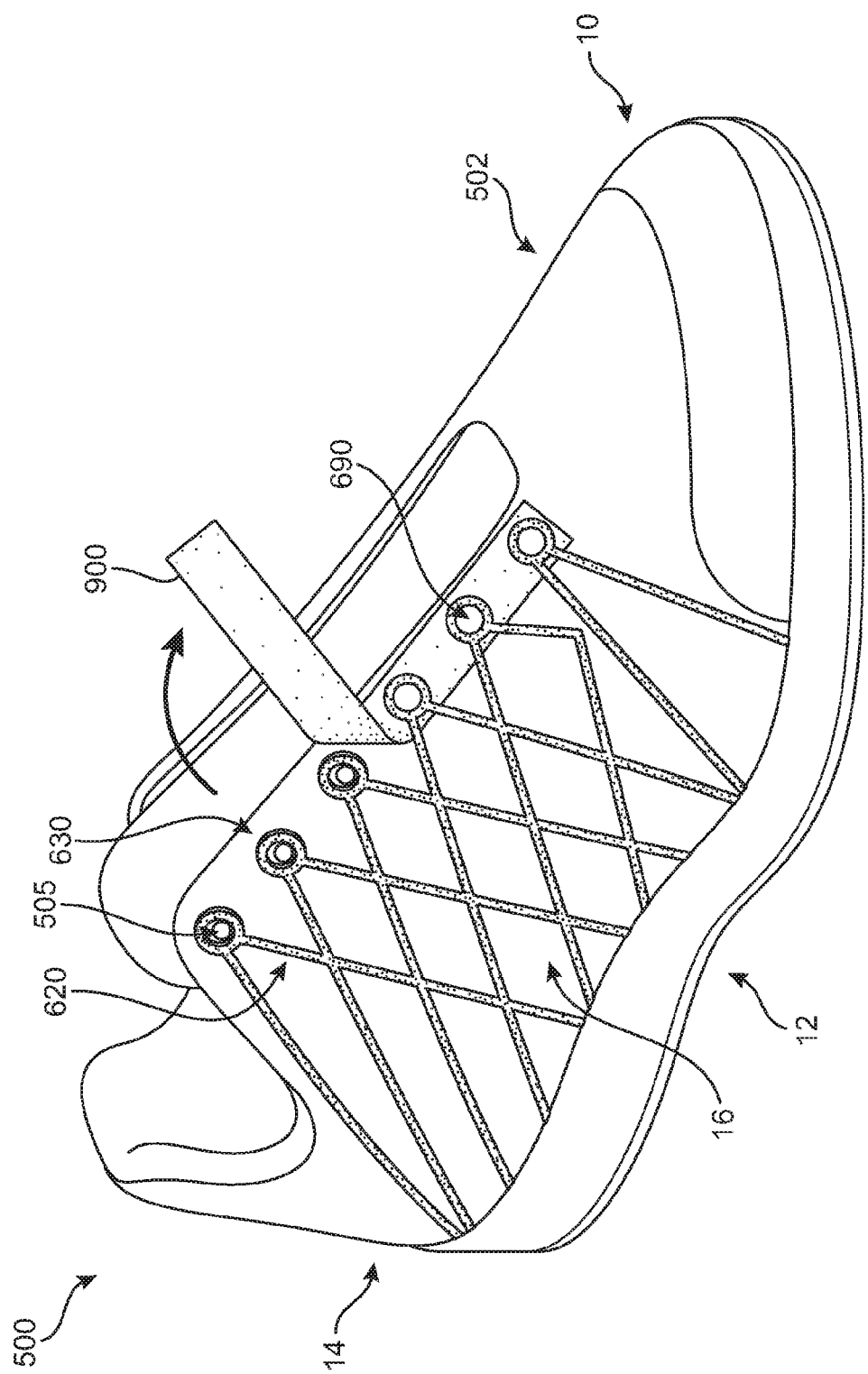
FIG. 19 is a side isometric view of the embodiment of the article of footwear having printed structures made from the method shown in FIGS. 14-17 further showing the release layer being removed.

FIGS. 18 and 19 illustrate an embodiment of article of footwear 500 made from the method described in FIGS. 14-17. As shown in FIG. 18, release layer 900 is initially disposed between fastener receiving portions 630 and upper 502 when fastener receiving portions 630 are printed. This method ensures fastener receiving portions 630 do not bond directly to a surface of upper 502. In contrast, extended portions 620 may remain at least partially embedded in upper 502.

Once first extended portions 620 and fastener receiving portions 630 are printed, release layer 900 may be removed, as shown in FIG. 19. In some methods, release layer 900 may be removed manually. In other methods, release layer 900 may be removed by an automated mechanism and process. After release layer 900 is removed from upper 502, fastener receiving portions 630 are now only connected to extended portions 620. Fastener receiving portions 630 may be characterized as free portions 680 (as shown in FIG. 17). In the embodiment shown in FIGS. 18 and 19, upper 502 includes apertures 505 such that a lace may pass through apertures 690 of fastener receiving portions 630 and/or apertures 505 on upper 502 (see FIG. 19). In other embodiments, upper 502 may not include apertures so that a lace may only be received through apertures 690 of fastener receiving portions 630.

Figure 20:
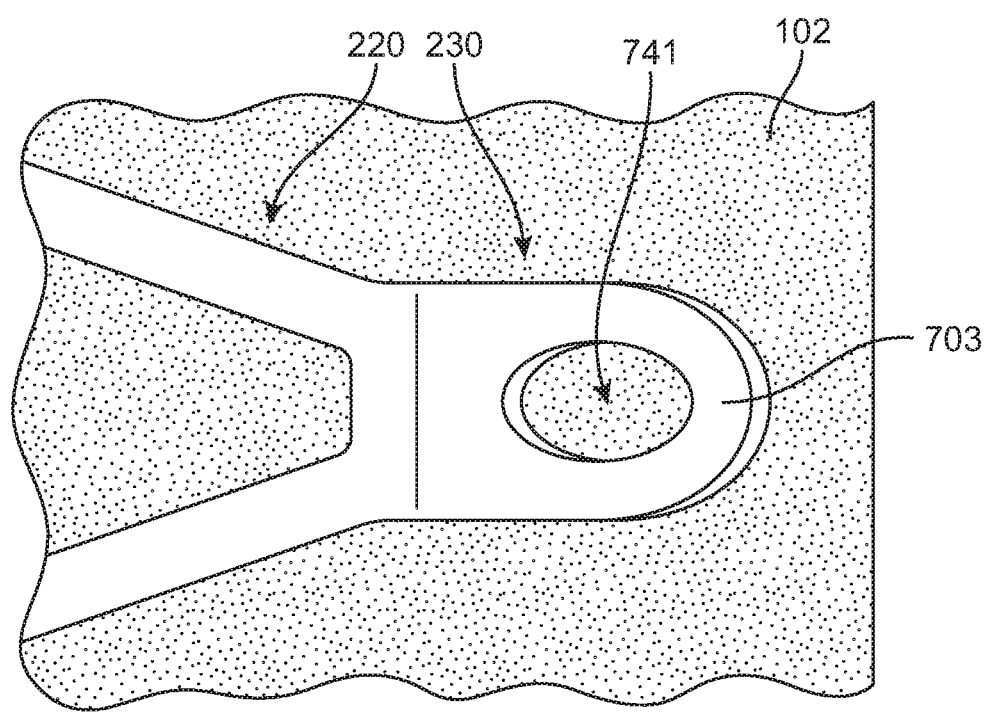
FIG. 20 is an enlarged view of another embodiment of a fastener receiving portion.
Figure 21:
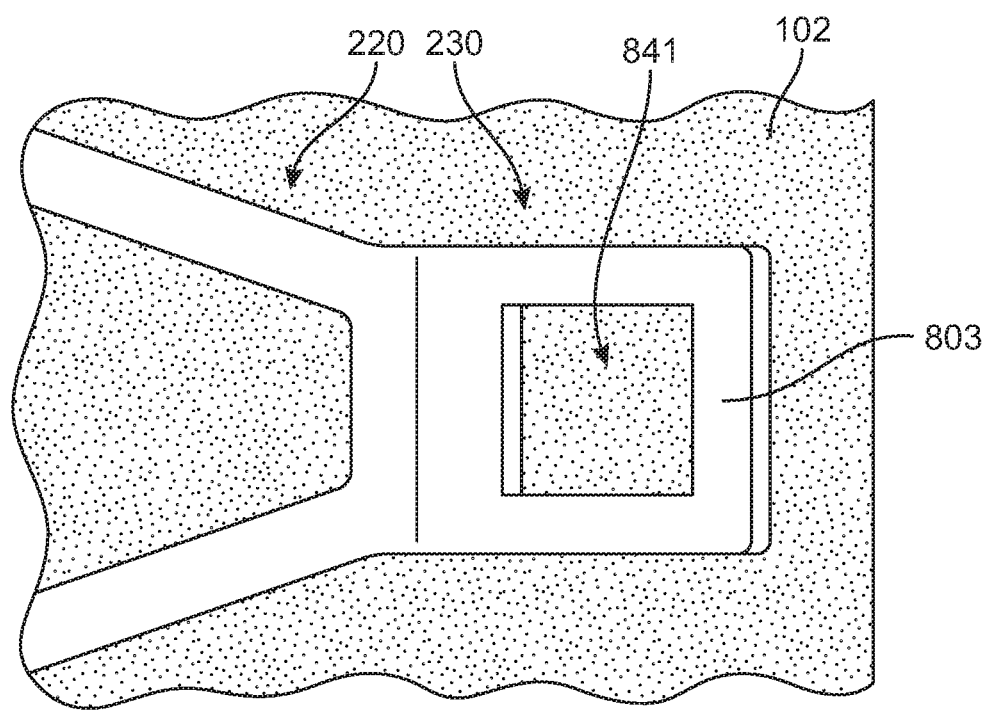
FIG. 21 is an enlarged view of another embodiment of a fastener receiving portion.

In previous embodiments, the fastener receiving portions of the printed structures generally have a rounded end portion with a circular aperture. However, in some embodiments, as shown in FIG. 20, aperture 741 of fastener receiving portion 230 may be oval shaped and end portion 703 may also be oval-shaped to match aperture 741. In other embodiments, as shown in FIG. 21, aperture 841 of fastener receiving portion 230 may be rectangular, and end portion 803 may also be rectangular. Still, in other embodiments, an aperture could be oval-shaped and an end portion could be rectangular (or vice-versa).

While various embodiments have been described, the description is intended to be exemplary, rather than limiting and it will be apparent to those of ordinary skill in the art that many more embodiments and implementations are possible that are within the scope of the embodiments. Accordingly, the embodiments are not to be restricted except in light of the attached claims and their equivalents. Also, various modifications and changes may be made within the scope of the attached claims.

What is claimed is:

1. An article of footwear, comprising:
   a sole structure;
   an upper comprising a textile material;
   a fastener receiving member attached to the upper, wherein the fastener receiving member comprises an extended portion and a fastener receiving portion, the fastener receiving portion being connected to the extended portion;
   wherein the extended portion and the fastener receiving portion are three-dimensionally printed structures comprising printable material;
   wherein the extended portion of the fastener receiving member is at least partially embedded within and bonded to the textile material; and
   wherein the fastener receiving portion includes a loop structure, the loop structure having an aperture for receiving insertion of a lace therethrough, the loop structure having an outer surface facing away from an exterior surface of the upper and an inner surface facing the exterior surface of the upper, the inner surface being spaced apart from the exterior surface of the upper and free to articulate relative to the exterior surface of the upper.

2. The article of footwear according to claim 1, wherein the fastener receiving portion extends away from the textile material.

3. The article of footwear according to claim 2, wherein:
   the extended portion is a first extended portion and wherein the fastener receiving member also includes a second extended portion;
   wherein a first end of the first extended portion is attached to the loop structure and a second end of the first extended portion extends away from the loop structure;
   wherein a first end of the second extended portion is attached to the loop structure and a second end of the second extended portion extends away from the loop structure; and
   wherein the second end of the first extended portion is spaced further from the second end of the second extended portion than the first end of the first extended portion is spaced from the first end of the second extended portion.

4. The article of footwear according to claim 3, wherein the first extended portion intersects at least a third extended portion, and wherein the second extended portion intersects at least a fourth extended portion.

5. The article of footwear according to claim 3, wherein a width of the first extended portion is approximately the same as a width of the second extended portion, and wherein the width of the first extended portion is approximately the same as a width of the loop structure.

6. The article of footwear according to claim 3, wherein the first extended portion forms an angle with the second extended portion at the loop structure, the angle being substantially greater than 0 degrees.

7. The article of footwear according to claim 2, wherein:
   the fastener receiving portion is disposed proximate a lacing region of the upper; and
   wherein a first end of the extended portion is attached to the fastener receiving portion and wherein a second end of the extended portion is disposed proximate the sole structure.

8. The article of footwear according to claim 1, wherein the extended portion of the fastener receiving member is at least partially embedded within the layer of textile material.

9. The article of footwear according to claim 8, wherein the upper includes a first aperture aligned with the aperture of the loop structure of the fastener receiving portion.

10. The article of footwear according to claim 9, wherein a diameter of the aperture of the loop structure is at least as large as a diameter of the first aperture of the upper.

11. An article of footwear, comprising:
    a sole structure;
    an upper comprising a textile material;
    a fastener receiving member attached to the upper, wherein the fastener receiving member comprises an extended portion and a fastener receiving portion, the fastener receiving portion being connected to the extended portion;
    wherein the extended portion and the fastener receiving portion are both three-dimensionally printed structures comprising printable material;
    wherein the extended portion of the fastener receiving member is at least partially embedded within and bonded to the textile material;
    wherein the fastener receiving portion includes a loop structure, the loop structure having an aperture for receiving insertion of a lace therethrough; and
    wherein a portion of the fastener receiving portion is unattached to the textile material of the upper, the loop structure having an outer surface facing away from an exterior surface of the upper and an inner surface facing the exterior surface of the upper, the inner surface being spaced apart from the exterior surface of the upper and free to articulate relative to the exterior surface of the upper.

12. The article of footwear according to claim 11, wherein the fastener receiving portion extends away from the textile material.

13. The article of footwear according to claim 12, wherein:
    the extended portion is a first extended portion and wherein the fastener receiving member also includes a second extended portion;
    wherein a first end of the first extended portion is attached to the loop structure and a second end of the first extended portion extends away from the loop structure;

wherein a first end of the second extended portion is attached to the loop structure and a second end of the second extended portion extends away from the loop structure; and wherein the second end of the first extended portion is spaced further from the second end of the second extended portion than the first end of the first extended portion is spaced from the first end of the second extended portion.

14. The article of footwear according to claim 13, wherein the first extended portion intersects at least a third extended portion, and wherein the second extended portion intersects at least a fourth extended portion.

15. The article of footwear according to claim 13, wherein a width of the first extended portion is approximately the same as a width of the second extended portion, and wherein the width of the first extended portion is approximately the same as a width of the loop structure.

16. The article of footwear according to claim 13, wherein the first extended portion forms an angle with the second extended portion at the loop structure, the angle being substantially greater than 0 degrees.

17. The article of footwear according to claim 12, wherein:
   the fastener receiving portion is disposed proximate a lacing region of the upper; and
   wherein a first end of the extended portion is attached to the fastener receiving portion and wherein a second end of the extended portion is disposed proximate the sole structure.

18. The article of footwear according to claim 11, wherein the extended portion of the fastener receiving member is at least partially embedded within the layer of textile material.

19. The article of footwear according to claim 18, wherein the upper includes a first aperture aligned with the aperture of the loop structure of the fastener receiving portion.

20. The article of footwear according to claim 19, wherein a diameter of the aperture of the loop structure is at least as large as a diameter of the first aperture of the upper.

* * * * *